United States Patent
Radpour

(10) Patent No.: US 10,142,842 B2
(45) Date of Patent: Nov. 27, 2018

(54) SECURING COMMUNICATIONS OF A WIRELESS ACCESS POINT AND A MOBILE DEVICE

(71) Applicant: AT&T INTELLECTUAL PROPERTY I, L.P., Atlanta, GA (US)

(72) Inventor: Assad Radpour, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/413,716

(22) Filed: Jan. 24, 2017

(65) Prior Publication Data

US 2017/0134956 A1    May 11, 2017

Related U.S. Application Data

(63) Continuation of application No. 13/278,702, filed on Oct. 21, 2011, now Pat. No. 9,565,558.

(51) Int. Cl.
*H04W 12/08* (2009.01)
*H04L 9/08* (2006.01)
(Continued)

(52) U.S. Cl.
CPC ............ *H04W 12/08* (2013.01); *H04L 9/083* (2013.01); *H04L 9/321* (2013.01); *H04L 9/3271* (2013.01);
(Continued)

(58) Field of Classification Search
CPC . H04L 63/08; H04L 63/04; H04L 9/08; H04L 63/062; H04L 63/061; H04L 63/102; H04W 12/04; H04W 88/10; H04W 88/12
See application file for complete search history.

(56) References Cited

U.S. PATENT DOCUMENTS 7,073,066 B1    7/2006 Nessett
7,424,024 B2    9/2008 Chen et al.
(Continued)

OTHER PUBLICATIONS

"WFA Device 1.0," WiFi Alliance, Template Version 1.01, Jan. 2006, pp. 1-8.
"WFA WLANConfig Service 1.0," WiFi Alliance, Service Template Version 1.01, Jan. 2006, pp. 1-22.
"Wi-Fi Protected Setup Specification," WiFi Alliance, Version 1.0h, Dec. 2006, 111 pages.
Bradner, S., "Key Words for Use in RFCs to Indicate Requirement Levels," Network Working Group Request for Comments: 2119, Category: Best Current Practice, Mar. 1997, http://www.ietf.org/rfc/rfc2119.txt, 3 pages.
Carpenter, B., Architectural Principles of the Internet, Network Working Group Request for Comments: 1958, Category: Informational, Jun. 1996, http://www.ietf.org/rfc/rfc1958.txt, 8 pages.
(Continued)

*Primary Examiner* — Hadi S Armouche
*Assistant Examiner* — Paul E Callahan
(74) *Attorney, Agent, or Firm* — Toler Law Group, PC

(57) ABSTRACT

A method includes receiving, at an access server, a communication from a network management device. The communication is sent from a mobile device via an unsecured wireless connection of a first network to an access point, from the access point to the network management device, and from the network management device via a second network to the access server. The communication includes first encrypted data and is associated with a request by the mobile device to access the second network. The method further includes transmitting, from the access server, an encryption key to the access point based on the first encrypted data to enable the access point to establish a secure wireless connection between the access point and the mobile device. The method further includes transmitting
(Continued)

signals to the network management device, the signals indicating that the mobile device is authorized to access the second network.

20 Claims, 13 Drawing Sheets

(51) Int. Cl.
    *H04L 9/32*     (2006.01)
    *H04W 12/04*     (2009.01)
    *H04L 29/06*     (2006.01)
    *H04W 84/12*     (2009.01)

(52) U.S. Cl.
    CPC .......... *H04W 12/04* (2013.01); *H04L 63/166* (2013.01); *H04L 2209/80* (2013.01); *H04W 84/12* (2013.01)

(56) References Cited

U.S. PATENT DOCUMENTS

| | | | |
|---|---|---|---|
| 7,668,954 | B1 | 2/2010 | Melvin |
| 7,735,114 | B2 * | 6/2010 | Kwan ................. H04L 63/08 455/410 |
| 9,037,149 | B2 | 5/2015 | Rahman et al. |
| 9,565,558 | B2 * | 2/2017 | Radpour ............... H04L 9/083 |
| 2003/0154381 | A1 | 8/2003 | Ouye et al. |
| 2003/0233580 | A1 | 12/2003 | Keeler et al. |
| 2004/0123159 | A1 | 6/2004 | Kerstens et al. |
| 2005/0089052 | A1 | 4/2005 | Chen et al. |
| 2005/0261970 | A1 | 11/2005 | Vucina et al. |
| 2006/0182076 | A1 | 8/2006 | Wang |
| 2006/0183463 | A1 | 8/2006 | Falk et al. |
| 2007/0064673 | A1 | 3/2007 | Bhandaru et al. |
| 2007/0206537 | A1 | 9/2007 | Cam-Winget et al. |
| 2007/0245148 | A1 | 10/2007 | Buer |
| 2008/0022392 | A1 | 1/2008 | Karpati et al. |
| 2008/0104672 | A1 | 5/2008 | Lunde et al. |
| 2008/0298333 | A1 | 12/2008 | Seok |
| 2009/0067441 | A1 | 3/2009 | Ansari et al. |
| 2009/0265541 | A1 | 10/2009 | Ylitalo et al. |
| 2010/0208897 | A1 | 8/2010 | Goto |
| 2010/0260069 | A1 | 10/2010 | Sakamoto et al. |
| 2011/0075589 | A1 | 3/2011 | Bradley et al. |
| 2011/0128378 | A1 | 6/2011 | Raji |
| 2011/0153355 | A1 | 6/2011 | Kenedy et al. |
| 2011/0153356 | A1 | 6/2011 | Kenedy et al. |
| 2011/0225417 | A1 | 9/2011 | Maharajh et al. |
| 2012/0042160 | A1 | 2/2012 | Nakhjiri et al. |
| 2012/0159150 | A1 | 6/2012 | Brown et al. |
| 2013/0007853 | A1 | 1/2013 | Gupta et al. |

OTHER PUBLICATIONS

Dierks, T. et al., "The TLS Protocol Version 1.0," Network Working Group Request for Comments: 2446, Category: Standards Track, Jan. 1999, http://www.ietf.org/rfc/rfc2246.txt, 75 pages.

Dierks, T. et al., The Transport Layer Security (TLS) Protocol Version 1.2, Network Working Group Request for Comments: 5246, Obsoletes: 3268, 4346, 4366, Updates: 4492, Category: Standards Track, Aug. 2008, http://tools.ietf.org/html/rfc5246, 105 pages.

Fielding, R. et al., "Hypertext Transfer Protocol—HTTP/1.1," Network Working Group Request for Comments: 2616, Obsoletes: 2068, Category: Standards Track, Jun. 1999, http://www.ietf.org/rfc/rfc2616.txt, 165 pages.

Hollenbeck, S., "Transport Layer Security Protocol Compression Methods," Network Working Group Request for Comments: 3749, Category: Standards Track, May 2004, http://www.ietf.org/rfc/rfc3749.txt, 8 pages.

Housley, R. et al., "Internet X.509 Public Key Infrastructure Certificate and CRL Profile," Network Working Group Request for Comments: 2459, Category: Standards Trach, Jan. 1999, http://www.ietf.org/rfc/rfc2459.txt, 75 pages.

Khare, R. et al., "Upgrading to TLS Within HTTP/1.1," Network Working Group Request for Comments: 2817, Updates: 2616, Category: Standards Track, May 2000, http://www.ietf.org/rfc/rfc2817/.txt, 13 pages.

Rescorla, E., "HTTP Over TLS," Network Working Group Request for Comments: 2818, Category: Informational, May 2000, http://www.ietf.org/rfc/rfc2818.txt, 4 pages.

Rescorla, E. et al., "The Secure HyperText Transfer Protocol," Network Working Group Request for Comments: 2660, Category: Experimental, Aug. 1999, http://www.rfc-editor.org/rfc/rfc2660.txt, 43 pages.

* cited by examiner

| Configuration 6030 | | | | |
|---|---|---|---|---|
| Source address information 7010 | Destination address information 7020 | Service information 7030 | Direction information 7040 | Permission information 7050 |
| Source address information 7011 | Destination address information 7021 | Service information 7031 | Direction information 7041 | Permission information 7051 |
| Source address information 7012 | Destination address information 7022 | Service information 7032 | Direction information 7042 | Permission information 7052 |
| Source address information 7013 | Destination address information 7023 | Service information 7033 | Direction information 7043 | Permission information 7053 |
| Source address information 7014 | Destination address information 7024 | Service information 7034 | Direction information 7044 | Permission information 7054 |
| Source address information 7015 | Destination address information 7025 | Service information 7035 | Direction information 7045 | Permission information 7055 |

SECURING COMMUNICATIONS OF A WIRELESS ACCESS POINT AND A MOBILE DEVICE

PRIORITY CLAIM

This application claims priority from, and is a continuation of, U.S. patent application Ser. No. 13/278,702, filed on Oct. 21, 2011, now U.S. Pat. No. 9,565,558, which is incorporated herein by reference in its entirety.

BACKGROUND

1. Technical Field

This disclosure relates generally to the field of wireless data communication utilizing at least two different networks and, more specifically, this disclosure pertains to the field of providing network access via a secure wireless connection.

2. Description of the Related Art

Some networks used for mobile device communications are facing increasing amounts of data traffic beyond available capacities. One possible remedy to this issue has been to offload and/or reroute data communications to existing Wi-Fi hotspots where a mobile device could detect a Wi-Fi access point (e.g., a publicly accessible wireless access point) at a Wi-Fi hotspot and connect to an available Wi-Fi network. However, communications between a mobile device and a Wi-Fi access point may not be secure (e.g., can be eavesdropped on or monitored by other devices). In the past, this created an issue for a possible user of the Wi-Fi access point at the Wi-Fi hotspot, if the Wi-Fi access point could not or did not offer over-the-air security in terms of a strong data encryption method as well as network authentication.

BRIEF DESCRIPTION OF THE DRAWINGS

The preferred embodiments will become apparent upon reading the following detailed description and upon reference to the accompanying drawings in which:

FIG. 7 provides a block diagram of an access control list configuration, according to one or more embodiments;

Figure 1:
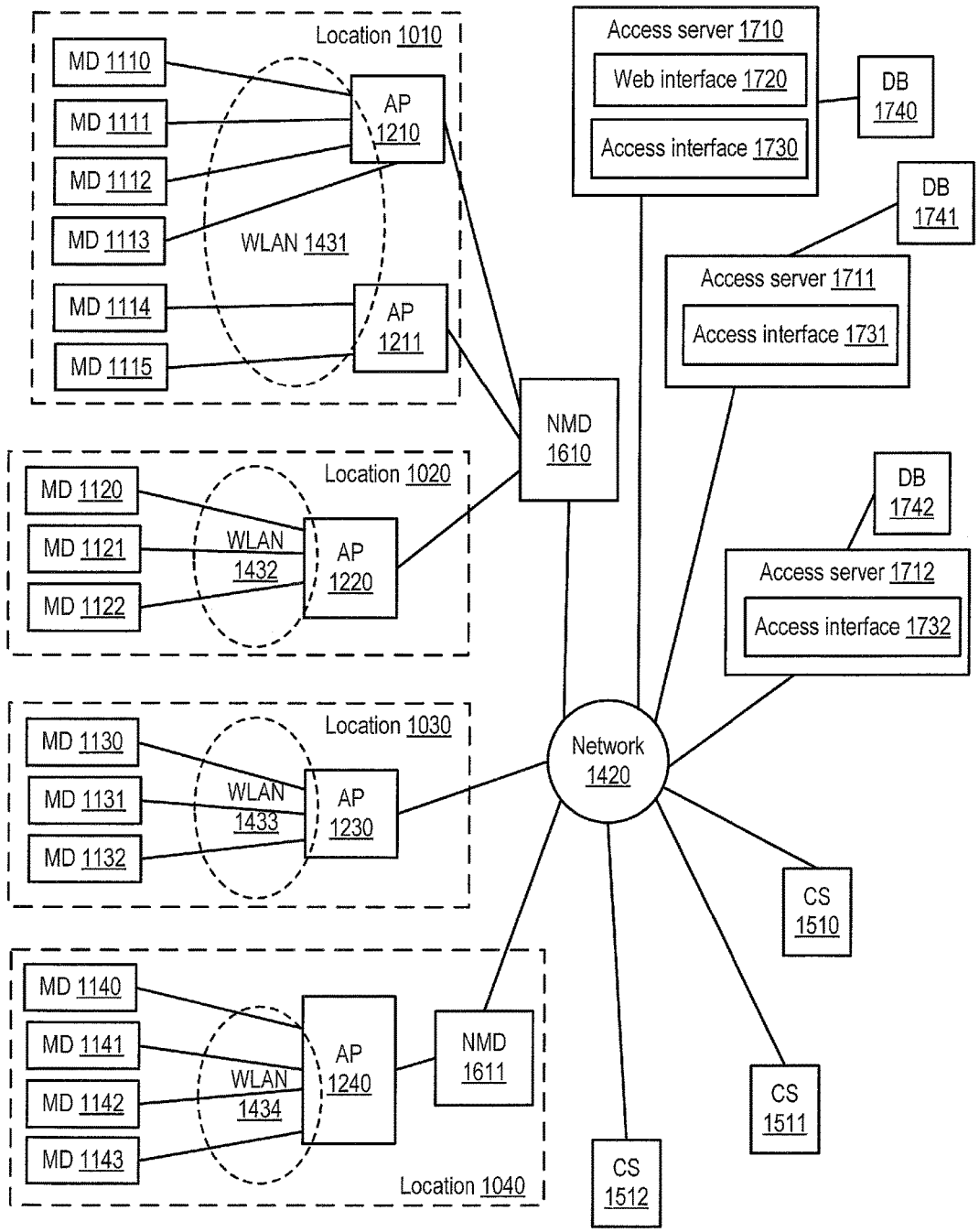
FIG. 1 provides a block diagram of one or more network communications systems, according to one or more embodiments.

While one or more embodiments may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

In one or more embodiments, a network provider can receive a request to access a public network (e.g., an Internet) via a wireless network implemented via at least one wireless access point. The network provider can receive first encrypted data that includes an encryption key via an otherwise unsecured wireless communication from a mobile device utilizing the wireless network, where the encryption key is subsequently utilizable for secure wireless communications between the mobile device and the at least one wireless access point. For example, the encryption key can be encrypted via a public encryption key associated with the network provider. For instance, the network provider can receive the encryption key via a hypertext transfer protocol secure (HTTPS). The network provider can decrypt the encryption key and can provide the encryption key to the at least one wireless access point implementing the wireless network and communicating with the mobile device.

In one or more embodiments, an encryption key can be a session encryption key that can be utilized for secure wireless communications between the mobile device and a wireless access point for a session (e.g., a period of time). In one example, a first session can include a first period of time where the mobile device of the user is accessing the public network via secure wireless communications between the mobile device and a first wireless access point. For instance, the first wireless access point can be located at an airport, and the mobile device and the first wireless access point can securely communicate via a first session encryption key. In a second example, a second session can include a second period of time, different from the first period of time, where the mobile device of the user is accessing the public network via secure wireless communications between the mobile device and a second wireless access point. For instance, the second wireless access point can be located at a hotel, and the mobile device and the second wireless access point can securely communicate via a second session encryption key, where the second session key is different from the first session key.

In a third example, a third session can include a third period of time, different from both the first and second periods of time, where the mobile device of the user is accessing the public network via secure wireless communications between the mobile device and the first wireless access point. For instance, the mobile device and the first wireless access point can securely communicate via a third session encryption key, where the third session key is different from both the first and second session key. In another example, a fourth session can include a fourth period of time, different from the first, second, and third periods of time, where the mobile device of the user is accessing the public network via secure wireless communications between the mobile device and the first wireless access point. For instance, the mobile device and the first wireless access point can securely communicate via a fourth session encryption key, where the fourth session key equal to or the same as the first session key. In one or more embodiments, a same session key can be utilized in different sessions. In one or more embodiments, a different session key can be utilized in different sessions.

In one or more embodiments, access of the public network can be permitted, and the at least one wireless access point and the mobile device can communicate in a secure fashion based on the encryption key. For example, each of the at least one wireless access point and the mobile device can determine a pairwise transient key based on the encryption key (e.g., a pairwise master key). In one instance, the mobile can encrypt second data via the pairwise transient key and can provide second encrypted data to the at least one wireless access point, and the at least one wireless access point can receive the second encrypted data and can decrypt the second encrypted data, via the pairwise transient key, to obtain the second data. For example, the second data can be provided to the public network. In another instance, third data can be received from the public network, and the at least one wireless access point can encrypt the third data via the pairwise transient key and can provide third encrypted data to the mobile device. The mobile device can receive the third encrypted data and can decrypt the third encrypted data, via the pairwise transient key, to obtain the third data.

Turning now to FIG. 1, a block diagram of one or more network communications systems is illustrated, according to one or more embodiments. As shown, one or more locations 1010-1040 can respectively include wireless access points (APs) 1210 and 1211, wireless access point (AP) 1220, wireless AP 1230, and wireless AP 1240. In one or more embodiments, locations 1010-1040 can include one or more of businesses, hotels, homes, airports, restaurants, geographic regions, planes, trains, automobiles, and coffee shops, among others. In one or more embodiments, one or more of wireless APs 1210-1240 can be coupled to a network 1420 and can provide communications access of network 1420 to one or more devices coupled to a respective wireless AP.

In one or more embodiments, a mobile device (MD) (e.g., a MD of mobile devices 1110-1143) can wirelessly communicate, when within a communications range, with a wireless AP (e.g., a wireless AP of wireless APs 1210-1230) using one or more of Institute of Electrical and Electronics Engineers (IEEE) 802.16, IEEE 802.11, IEEE 802.15, IEEE 802.15.4, ZigBee, wireless Ethernet, Wi-Fi, ultra wide band, wireless universal serial bus (USB) and/or infrared communication technologies, among others. For example, the MD can wirelessly communicate with the wireless AP when the MD is located at a location that includes the wireless AP or includes wireless coverage from the wireless AP. In one or more embodiments, a location can be described and/or defined by an area or volume where communication is possible with one or more wireless APs.

In one or more embodiments, one or more wireless APs can include and/or implement a wireless local area network (WLAN) that can be accessed by one or more mobile devices (MDs). For example, one or more MDs can be wirelessly coupled to a WLAN that can be implemented via one or more wireless APs. In one instance, one or more of MDs 1110-1115 can be wirelessly coupled to WLAN 1431 that can be implemented via wireless APs 1210 and 1211. In a second instance, one or more of MDs 1120-1122 can be wirelessly coupled to WLAN 1432 that can be implemented via wireless AP 1220. In a third instance, one or more of MDs 1130-1132 can be wirelessly coupled to WLAN 1433 that can be implemented via wireless AP 1230. In another instance, one or more of MDs 1140-1143 can be wirelessly coupled to WLAN 1434 that can be implemented via wireless AP 1240. In one or more embodiments, when a MD is wirelessly coupled to a WLAN implemented via one or more wireless APs, the MD can be wirelessly coupled to at least one AP of the one or more wireless APs that implement the WLAN.

In one or more embodiments, a wireless AP can include a transceiver to wirelessly communicate with one or more MDs using one or more wireless methods, processes, protocols, and/or wireless spectrums (e.g., frequency ranges). In one example, a wireless AP can wirelessly communicate with one or more MDs using one or more ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others.

In one or more embodiments, a WLAN can be secured via one or more encryption keys. In one example, one or more wireless APs can use a Wired Equivalent Privacy (WEP) encryption key and/or protocol in implementing a WLAN. In a second example, one or more wireless APs can utilize a Wi-Fi Protected Access (WPA) (e.g., WPA version 1, WPA version 2, etc.) encryption key and/or protocol in implementing a WLAN.

In one instance, the one or more wireless APs and/or a network system that utilizes the one or more wireless APs can utilize an encryption key and/or related protocols in implementing a WLAN without utilizing an extensible authentication protocol (EAP), such as EAP-transprot layer security (EAP-TLS), EAP-message digest five (EAP-MD5), EAP-preshared key (EAP-PSK), EAP-tunneled transport layer security (EAP-TTLS), EAP-Internet key exchange (EAP-IKE) (e.g., EAP-IKE version 1, EAP-IKE version 2, etc.), EAP-flexible authentication via secure tunneling (EAP-FAST), EAP-subscriber identity module (EAP-SIM) or EAP for GSM subscriber identity, EAP-authentication and key agreement (EAP-AKA) or EAP for UMTS authentication key agreement, EAP-AKA prime (EAP-AKA'), EAP-generic token card (EAP-GTC), EAP-encryption key exchange (EAP-EKE), etc. In a second instance, the one or more wireless APs and/or a network system that utilizes the one or more wireless APs can utilize a WPA encryption key and/or protocol in implementing a WLAN without utilizing an EAP, such as EAP-TLS, EAP-MD5, EAP-PSK, EAP-TTLS, EAP-IKE, EAP-FAST, EAP-SIM or EAP for GSM subscriber identity, EAP-AKA or EAP for UMTS authentication key agreement, EAP-AKA', EAP-GTC, EAP-EKE, etc. In another instance, the one or more wireless APs and/or a network system that utilizes the one or more wireless APs can utilize an encryption key and/or related protocols in implementing a WLAN without utilizing IEEE 802.1X.

In another example, one or more wireless APs can utilize multiple WPA encryption keys in implementing a WLAN. For instance, each of the one or more wireless APs can use multiple WPA encryption keys in implementing a WLAN. In one or more embodiments, each of the one or more wireless APs can communicate with multiple different MDs and can utilize different respective WPA encryption keys to wirelessly communicate with the different MDs. For example, a wireless AP (e.g., AP 1210) can wirelessly communicate with a first MD (e.g., MD 1110) utilizing a first WPA encryption key and can concurrently wirelessly communicate with a second MD (e.g., MD 1112) utilizing a second, different, WPA encryption key. In this fashion, communications between wireless AP 1210 and each of two or more of MDs 1110-1113 can be secured.

In one or more embodiments, utilizing a WPA encryption key can include utilizing encrypted wireless communications based on the WPA encryption key. In one example, the encrypted wireless communications can utilize one or more encrypted keys that are based on and/or derived from the WPA encryption key. For instance, each of a wireless AP and a MD can derive and/or determine a pairwise transient key (PTK) from a pairwise master key (PMK) (e.g., the WPA encryption key), and each of the wireless AP and the MD can wirelessly transmit encrypted data, based on the PTK, to the other. In another example, the encrypted wireless communications can utilize the WPA encryption key (e.g., the PMK) as described by an IEEE 802.11i standard, which is available from the Institute of Electrical and Electronics Engineers.

As illustrated, MDs 1110-1113 can be coupled to network 1420 via wireless AP 1210 and a network management device (NMD) 1610, where wireless AP 1210 can be coupled to NMD 1610. In one or more embodiments, NMD 1610 can provide authentication, quality of service (QoS), communication traffic shaping, and/or access control from one or more computing devices (e.g., MDs 1110-1122) and/or one or more wireless APs 1210-1220 to network 1420.

In one example, NMD 1610 can be or include a registrar that can permit and/or revoke access to one or more wireless local area networks (WLANs) secured with one or more encryption keys. In a second example, NMD 1610 can include an access control list (ACL) that can be modifiable, and NMD 1610 can use the ACL to permit and/or deny access, of one or more computing devices (e.g., MDs 1110-1122), of network 1420. In another example, NMD 1610 can include one or more firewall rules that can be modifiable, and NMD 1610 can use the one or more firewall rules to permit and/or deny access, of one or more computing devices (e.g., MDs 1110-1122), of network 1420.

In one or more embodiments, NMD 1610 can perform one or more processes and/or methods that can modify the ACL and/or the one or more firewall rules. In one or more embodiments, NMD 1610 can receive one or more signals from a remote signaling device, and NMD 1610 can modify the ACL and/or the one or more firewall rules based on the received one or more signals from the remote signaling device.

In one or more embodiments, signals and/or signaling can be used in communicating establishment and/or control of communications and/or access of a network, one or more services of the network, and/or one or more resources of the network. For example, the signals and/or signaling can include and/or can be based on one or more of Signaling System No. 7 (SS7), Common Channel Signaling System 7 (CCSS7), Universal Plug and Play (UPnP), and RADIUS (Remote Authentication Dial In User Service), among others. In one or more embodiments, signals and/or signaling can be used between two different network providers and/or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, control data, etc.) that is different than user information transfer (e.g., a telephone conversation between two users, a text message communication between two users, etc.).

As shown, MD 1120 can be coupled to network 1420 via wireless AP 1220 and NMD 1610, and MD 1130 can be coupled to network 1420 via wireless AP 1230. In one or more embodiments, one or more MDs (e.g., MDs 1110, 1115, 1120, and 1130) can be coupled to network 1420 after being coupled to a respective WLAN and/or wireless AP. For example, the one or more MDs can be coupled to a respective WLAN after utilizing respective configuration data received from a respective registrar. As shown, one or more of MDs 1140-1143 can be coupled to wireless AP 1240 that can be coupled to a NMD 1611, and NMD 1611 can be coupled to network 1420. In one or more embodiments, NMD 1611 can include one or more structures and/or functionalities of NMD 1610.

In one or more embodiments, network 1420 can provide access and/or services of one or more other networks (e.g., including an Internet) to one or more MDs via one or more wireless APs. In one or more embodiments, access to these other networks can include one or more "services" these other networks can provide. For example, these one or more services can include one or more of: email, world wide web (WWW), file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, MySQL, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others.

In one or more embodiments, the one or more service can utilize, be associated with, and/or correspond to one or more protocols of one or more computer and/or software applications. For example, the one or more protocols can include one or more of Internet protocol (IP), transmission control protocol (TCP), user datagram protocol (UDP), address resolution protocol (ARP), hypertext transfer protocol (HTTP), HTTP secure (HTTPS), network control protocol (NCP), network time protocol (NTP), serial line Internet protocol (SLIP), simple mail transfer protocol (SMTP), simple network management protocol (SNMP), bootstrap protocol (BOOTP), connectionless network protocol (CLNP), dynamic host configuration protocol (DHCP), external gateway protocol (EGP), Internet group management protocol (IGMP), and point-to-point protocol (PPP), among others.

In one or more embodiments, a wireless AP can provide authentication, accounting, authorization, QoS, communication traffic shaping, and/or access control from one or more devices coupled to the wireless AP. In one example, wireless AP 1230 can be or include a registrar that can permit and/or revoke access to one or more WLANs secured with one or more encryption keys. In another example, wireless AP 1230 can include an ACL that can be modifiable, and wireless AP 1230 can use the ACL to permit and/or deny access of one or more MDs to network 1420 and/or services associated with network 1420. In one or more embodiments, wireless AP 1230 can perform one or more processes and/or methods that can modify the ACL. For example, wireless AP 1230 can receive one or more signals from a remote signaling device (e.g., an access control server), and the ACL of wireless AP 1230 can be modified based on the received one or more signals from the remote signaling device.

In one or more embodiments, one or more of MDs 1110-1143 can communicate, in a wireless fashion, with a wireless telecommunications network. For example, the wireless telecommunications network can support one or more wireless telecommunications network protocols such as one or more of General Packet Radio Service (GPRS), enhanced data rates for GSM evolution (EDGE), long term evolution (LTE), CDMA (code division multiple access), TDMA (time division multiple access), and FDMA (frequency division multiple access), among others. For instance, the wireless telephony network can be coupled to and/or include a telephony network that can include a wireless cellular telecommunications network and/or a wireless satellite telecommunications network. In one or more embodiments, the wireless telephony network can communicate information such as voice and/or data.

In one or more embodiments, the wireless telephony network provides access and/or services of one or more other networks at a lower data rate than a network 1420 can provide to one or more of MDs 1110-1143. For example, the wireless telephony network can include less bandwidth than network 1420. In one or more embodiments, the wireless telephony network can provide access and/or services of one or more other networks (e.g., including an Internet) to one or more MDs. For example, the wireless telephony network can provide access and/or services of one or more other networks (e.g., including an Internet) to one or more MDs via one or more base transceiver stations of a cellular telephone network and/or one or more satellites. In one or more embodiments, access to these other networks can include one or more "services" these other networks can provide. In one or more embodiments, the one or more service can utilize, be associated with, and/or correspond to one or more protocols of one or more computer and/or software applications. For example, the one or more "services" these other networks may provide and/or the one or more protocols can be described with reference to network 1420. In one or more embodiments, the wireless telephony network can be coupled to network 1420.

In one or more embodiments, the wireless telephony network and/or network 1420 can include a wired network, a wireless network or a combination of wired and wireless networks. The wireless telephony network and/or network 1420 can include and/or be coupled to various types of communications networks, such as a public switched telephone network (PSTN), an Internet, a wide area network (WAN) (e.g., a private WAN, a corporate WAN, a public WAN, etc.), a local area network (LAN), etc. In one or more embodiments, a wireless AP can be coupled to a PSTN, e.g., via Ethernet, DSL (digital subscriber line), T-1, etc.; a cable (television) based network; a satellite-based system; and/or a fiber based network; among others. In one or more embodiments, the wireless telephony network and/or network 1420 can include one or more wireless networks, e.g., based on IEEE 802.11, IEEE 802.16 and/or LTE, among others. For instance, one or more of wireless APs 1210-1240 can be coupled to network 1420 in a wireless fashion. The wireless telephony network and/or network 1420 can include one or more DSL and/or cable (e.g., cable television) networks and/or infrastructures. For example, the wireless telephony network and/or network 1420 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1420 may form part of the Internet, or may couple to other networks, e.g., other local or wide area networks such as the Internet. In one or more embodiments, a wireless AP can be a system operable to be coupled to and/or include networking equipment usable to couple the wireless AP to network 1420. In one example, wireless AP 1210 can include a wired interface that can be coupled to a gateway device. For instance, the gateway device can include a cable modem, a DSL modem, a router, a network bridge, etc., and the wired interface of wireless AP 1210 can be coupled to the gateway device via Ethernet, FDDI (fiber distributed data interface), etc.

In one or more embodiments, each MD of MDs 1110-1143 can include and/or can be coupled to one or more transceivers that allow the MD to wirelessly communicate with the wireless telephony network and/or a wireless AP of wireless APs 1210-1240. For example, MD 1110 can include or be coupled to a first transceiver that can communicate with the wireless telephony network and/or include or be coupled to a second transceiver to communicate with wireless AP 1210. For instance, MD 1110 can include or be coupled to a first transceiver that can communicate with a base transceiver station of or coupled to the wireless telephony network and/or include or be coupled to a second transceiver (e.g., a wireless Ethernet transceiver) to communicate with wireless AP 1210. For instance, MD 1110 can communicate voice data via the first transceiver and IP data (e.g., email data, WWW data, streaming audio data, streaming video data, user application data, etc.) via the second transceiver.

As shown, access servers 1710-1712 can be coupled to network 1420. In one or more embodiments, access server 1710 can be operated by a first network provider, access server 1711 can be operated by a second network provider, and/or access server 1712 can be operated by a third network provider. For example, an access server operated by a network provider can be an access control server for subscribers of the network provider. In one or more embodiments, one or more of access servers 1710-1712 can provide and/or implement one or more of authentication, authorization, and accounting (AAA) services. For example, authentication and/or authorization can be utilized in access control of a network, one or more services of the network, and/or one or more resources of the network. In one or more embodiments, an authentication service can include a process and/or method of verifying an identity (e.g., an identity of a device, an identity of a user of a device, etc.). For example, one or more of a username, a password, a telephone identification (e.g., an IMSI, a MSISDN, a portion of a MSISDN, etc.), and a medium access control (MAC) address, among others, can be used to verify and/or authenticate an identity of a device, an identity of a user of a device, etc. In one or more embodiments, an authorization service can include a process and/or method of determining what an authenticated device and/or an authenticated user of a device can utilize, access, do, and/or perform, etc. In one or more embodiments, an accounting service can include accounting, determining, measuring, and/or documenting one or more resources utilized by a device and/or user of a device during access to services available to a device and/or user of a device via an authorization service.

In one or more embodiments, one or more of access servers 1710-1712 can include one or more interfaces. For example, the one or more interfaces can include one or more a RADIUS (remote access dialin user service) interface, a DIAMETER (an extension and improvement of RADIUS)

interface, a UPnP interface, and a web interface, among others. Other services for providing one or more of authentication, authorization, and accounting services can include EAP, TACACS (Terminal Access Controller Access Control System), TACACS+, XTACAS, IEEE 802.1x, UPnP, WPA, and/or IEEE 802.11i, among others, and one or more interfaces can be used for these services. In one or more embodiments, these can also be used for applications, such as access to network service or IP mobility, and are intended to work in both local AAA and roaming situations.

In one or more embodiments, a first interface and a second interface of two or more interfaces can interact with each other. For example, access server 1710 can include a web interface 1720 (e.g., a web server) and an access interface 1730 (e.g., a RADIUS server). The web interface can accept identification information from a web browser (e.g., a web browser executed on MD 1115) and provide the identification information to access interface 1730, where access interface 1730 can perform an authentication service. In one or more embodiments, a computing device (e.g., MD 1115) and web interface 1720 can communicate using a HTTP and/or a HTTPS.

In one or more embodiments, access interface 1730 can utilize a database 1740 in performing the authentication service. In one example, database 1740 can store multiple username and password pairs. In another example, database 1740 can include one of a home location register (HLR) and a visitor location register (VLR). In one or more embodiments, access interface 1730 can proxy a received access request. For example, the access request can include an authentication request and/or an authorization request. In one instance, access interface 1730 can include a first RADIUS server, and the first RADIUS server can proxy one or more of a received authentication request and a received authorization request to access interface 1731 (e.g., a second RADIUS server). In a second instance, access interface 1732 can proxy a received access request. For example, the access request can include an authentication request and/or an authorization request. For one instance, access interface 1732 can include a third RADIUS server, and the third RADIUS server can proxy one or more of a received authentication request and a received authorization request to access interface 1731 (e.g., a second RADIUS server).

In one or more embodiments, access interface 1731 can utilize a database 1741 in performing one or more of an authentication service and an authorization service. In one example, database 1741 can store multiple username and password pairs. In another example, database 1741 can include one of a HLR and a VLR. As illustrated, access servers 1710-1712 can be coupled to respective databases 1740-1742. In one or more embodiments, access servers 1710-1712 can include respective databases 1740-1742.

As illustrated, one or computer systems 1510-1512 can be coupled to network 1420. In one or more embodiments, one or more of MDs 1110-1143 can request and/or receive information from one or computer systems 1510-1512 via network 1420. In one example, computer system (CS) 1510 can include a web server that can receive requests from and/or provide information to one or more of MDs 1110-1143. In a second example, CS 1511 can include a "push server" that can provide information to one or more of MDs 1110-1143 as the information become available. In another example, CS 1512 can include a storage server that can receive requests to store information and/or provide stored information to one or more of MDs 1110-1143. For instance, CS 1512 can be included in and/or utilized in implementing a "cloud" storage service.

In one or more embodiments, various computing devices described herein can communicate using one or more secure communications. For example, a first computing device can communicate with a second computing device utilizing one or more of transport layer security (TLS), HTTPS, a virtual private network (VPN), IPsec, and/or a secure socket layer (SSL), among others.

Figure 2A:
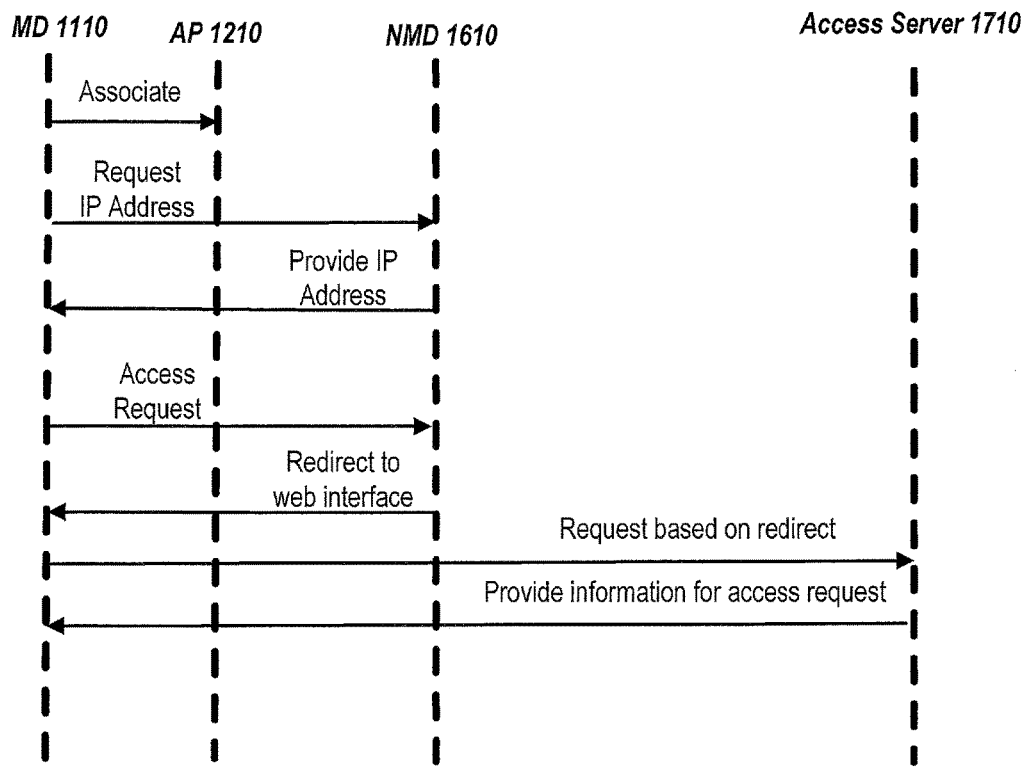
FIGS. 2A-2I provide exemplary sequence diagrams of securing communications and permitting network access, according to one or more embodiments.

Turning now to FIGS. 2A-2I, exemplary sequence diagrams are illustrated, according to one or more embodiments. Two or more of the sequence diagrams illustrated in FIGS. 2A-2I can be combined to illustrate one or more systems and/or one or more functionalities associated with securing communications between a wireless AP and a MD and/or providing network access to the MD, according to one or more embodiments. As illustrated in FIG. 2A, MD 1110 can associate with wireless AP 1210. For example, MD 1110 can utilize a service set identifier (SSID) of wireless AP 1210 and/or a basic service set identifier (BSSID) of wireless AP 1210 in associating with wireless AP 1210. For instance, each of MD 1110 and wireless AP 1210 can function in an infrastructure mode, and wireless AP 1210 can perform one or more functions as a master.

After MD 1110 associates with wireless AP 1210, MD 1110 and wireless AP 1210 can communicate in a non-secure wireless fashion. For example, one or more of MDs 1111-1113 can monitor (e.g., eavesdrop on) one or more wireless communications between MD 1110 and wireless AP 1210. In one instance, the one or more wireless communications between MD 1110 and wireless AP 1210, that can be monitored by one or more of MDs 1111-1113, can include one or more unicast IP communications that are addressed to MD 1110 and not addressed to any of MDs 1111-1113. In another instance, the one or more wireless communications between MD 1110 and wireless AP 1210, that can be monitored by one or more of MDs 1111-1113, can include one or more unicast link layer (e.g., MAC layer) communications that are addressed to MD 1110 and not addressed to any of MDs 1111-1113.

As illustrated, MD 1110 can request an IP address. In one or more embodiments, NMD 1610 can include a DHCP server that can receive a request for an IP address and provide an IP address in response to and/or based on the request for an IP address. In one example, the request for an IP address can include a MAC address of a computing device (e.g., MD 1110) making the request, and the DHCP server can provide an IP address to the computing device based on the MAC address. As shown, NMD 1610 can provide an IP address to MD 1110.

In one or more embodiments, wireless AP 1210 can function as a bridge. For example, wireless AP 1210 can bridge WLAN 1431 to a wired coupling (e.g., an Ethernet coupling) of wireless AP 1210 to NMD 1610. For instance, wireless AP 1210 can bridge data link layers of WLAN 1431 to a wired Ethernet interface of NMD 1610 or a routing computing device.

In one or more embodiments, MD 1110 can transmit an access request. As illustrated, NMD 1610 can receive the access request. In one example, the access request can include a request for information from a computer system that is not included in a local area network to which MD 1110 is included. For instance, the access request can include a request for information from CS 1510. In one or more embodiments, NMD 1610 can intercept the request. For example, NMD 1610 can include and/or implement an access controller that intercepts access requests from computing devices. For instance, an access request can include one or more data packets (e.g., MAC packets, IP packets, TCP packets, UDP packets, etc.), and the access controller can examine information included in the one or more data packets. For example, the access controller can examine a destination address, a source address, a destination port, a source port, etc. In one or more embodiments, the access controller can include and/or implement a firewall and/or one or more services and/or attributes associated with a firewall.

As shown, NMD 1610 can redirect the access request, from MD 1110, to a web interface. In one or more embodiments, the web interface can be or include one or more of a web server and a secure web server (e.g., a web server that utilizes HTTPS in communicating with clients). In one example, NMD 1610 can include the web interface. In another example, access server 1710 can include the web interface (e.g., web interface 1720), and NMD 1610 can redirect the access request to access server 1710, as illustrated. In one or more embodiments, redirecting the access request to the web interface can include providing a HTTP redirect message to MD 1110. For example, the HTTP redirect message can include a HTTP status of "302" or "303". In one or more embodiments, NMD 1610 can include and/or implement an access controller that can determine to redirect the access request based on information from an ACL.

As illustrated, MD 1110 can transmit a request based on a redirection of the access request. In one or more embodiments, the request based on the redirection of the access request can include a HTTP GET request of access server 1710 and/or web interface 1720. In one example, a web browser of MD 1110 can transmit the request based on the redirection of the access request. For instance, the request from the web browser can include a HTTP GET request of web interface 1720 of access server 1710.

In another example, a client application, different from a web browser, of MD 1110 can transmit the request based on the redirection of the access request. In one instance, the request from the client application can include a HTTP GET request of web interface 1720 of access server 1710. In another instance, the request from the client application can include a request of a server application of access server 1710. In one or more embodiments, the client application of MD 1110 can receive information via one or more hypertext markup language (HTML) comments included in the redirection of the access request. For example, the HTML comments can be ignored and/or disregarded by a web browser while the client application of MD 1110 can utilize information included in the HTML comments in transmitting the request based on the redirection of the access request.

As shown, access server 1710 can provide information for the access request to MD 1110. In one example, web interface 1720 of access server 1710 provides information via a web page to a web browser of MD 1110. In a second example, a server interface of access server 1710 provides information to a client application, different from a web browser, of MD 1110. In another example, web interface 1720 of access server 1710 provides information to a client application, different from a web browser, of MD 1110.

Figure 2B:
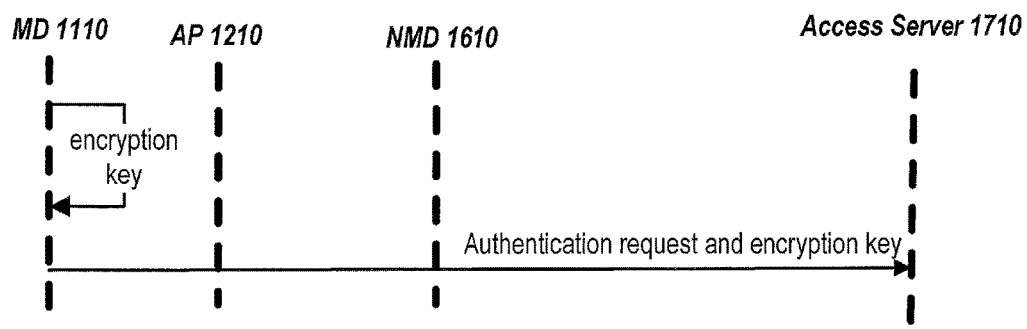

As illustrated in FIG. 2B, MD 1110 can obtain an encryption key. In one or more embodiments, the encryption key can include one or more of a number and a string of alphanumeric characters. In one example, MD 1110 can obtain the encryption key via user input. In one instance, the user can input the encryption key into a web browser via a keyboard, key pad, touch screen, etc. In another instance, the user can input the encryption key into a client application, different from a web browser, of MD 1110. In a second example, MD 1110 can obtain the encryption key via a storage device of MD 1110. In one instance, the storage device can include a non-volatile memory device. In another instance, the storage device can include a subscriber identification module (SIM) of MD 1110.

In another example, MD 1110 can obtain the encryption key via an encryption key generation system, process, and/or method. In one instance, MD 1110 can obtain the encryption key via a random number generation system, process, and/or method. In another instance, MD 1110 can obtain the encryption key via a cryptographic hash generation system, process, and/or method. In one or more embodiments, the encryption key can be utilized to generate a PMK for secure and/or encrypted wireless communications between MD 1110 and AP 1210. In one or more embodiments, the encryption key can be utilized as a PMK for secure and/or encrypted wireless communications between MD 1110 and AP 1210.

As shown, MD 1110 can provide an authentication request and the encryption key to access server 1710. In one or more embodiments, the authentication request can include one or more of a username, a password, and a device identification (e.g., a MAC address, an IMSI, a MSISDN, a portion of a MSISDN, etc.), among others, that can be used to verify and/or authenticate an identity of MD 1110, an identity of a user of a MD 1110, etc.

In one or more embodiments, MD 1110 can provide the authentication request and the encryption key to access server 1710 in a secure fashion. For example, MD 1110 can provide the authentication request and the encryption key to access server 1710 in an encrypted fashion. In one instance, MD 1110 can provide the authentication request and the encryption key to access server 1710 via a SSL, TLS, and/or HTTPS. In this fashion, one or more of MDs 1111-1113, that can monitor wireless communications of MD 1110 and wireless AP 1210, may not determine information of the authentication request and/or the encryption key, since the information of the authentication request and the encryption key are encrypted via a SSL, a hypertext transfer protocol secured, etc.

For example, the information of the authentication request and the encryption key can be encrypted based on a public encryption key (e.g., an asymmetric public encryption key or a symmetric public encryption key) provided by access server 1710 (e.g., provided via a digital certificate). For instance, one or more of MDs 1111-1113 may not determine the information of the authentication request and/or the encryption key encrypted based on the public encryption key, since one or more of MDs 1111-1113 may not have access to a private encryption key (e.g., an asymmetric private encryption key or a symmetric private encryption key) that is associated with and/or pair with the public encryption key. In one or more embodiments, the information of the authentication request and/or the encryption key encrypted based on the public encryption key can be decrypted utilizing the private encryption key that is associated with and/or pair with the public encryption key. For example, web interface 1720 can include and/or access the private key and decrypt the authentication request and/or the encryption key that was encrypted based on the public encryption key.

In one or more embodiments, MD 1110 can store, in a memory medium, a public encryption key of access server 1710. For example, a network provider can provide the public encryption key of access server 1710 to MD 1110. In one instance, the network provider can provide the public encryption key of access server 1710 to MD 1110 when MD 1110 is provisioned and/or setup. In another instance, the network provider can periodically provide the public encryption key of access server 1710, and/or one or more public encryption keys of one or more respective access servers, to MD 1110. In one or more embodiments, MD 1110 can store, in a memory medium, encrypted MAC address data. For example, a network provider can encrypt, utilizing a private encryption key of access server 1710, a MAC address of MD 1110, which can be included in the encrypted MAC address data, and can provide the encrypted MAC address data to MD 1110. For instance, the network provider can provide the encrypted MAC address data when MD 1110 is provisioned and/or setup. In one or more embodiments, identification information associated with a user of MD 1110 can include the encrypted MAC address data.

Figure 2C:
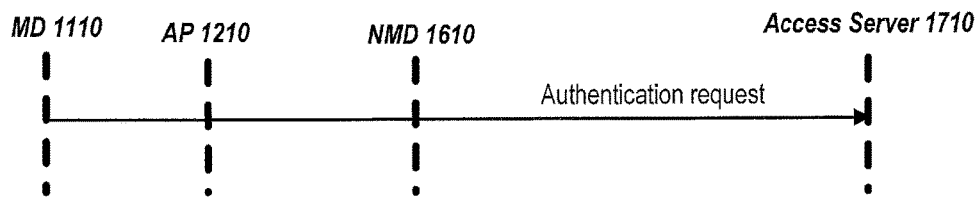

In one or more embodiments, FIG. 2C can be utilized in place of FIG. 2B. As illustrated in FIG. 2C, MD 1110 can provide an authentication request to access server 1710. For example, MD 1110 may not provide the encryption key to access server 1710. In one or more embodiments, the authentication request can include one or more of a username, a password, and a device identification (e.g., MAC address, an IMSI, a MSISDN, a portion of a MSISDN, etc.), among others, that can be used to verify and/or authenticate an identity of MD 1110, an identity of a user of a MD 1110, etc. In one or more embodiments, MD 1110 can provide an authentication request to access server 1710 in a secure fashion. For example, MD 1110 can provide an authentication request to access server 1710 via a SSL, TLS, and/or HTTPS.

Figure 2D:
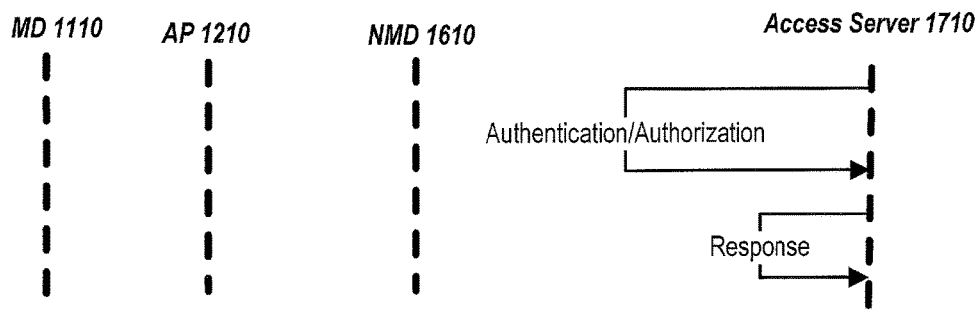

As illustrated in FIG. 2D, access server 1710 can perform an authentication and/or authorization based on the authentication request. In one or more embodiments, performing the authentication can include one or more of verifying an identity of MD 1110 and verifying an identity of a user of MD 1110, among others. For example, access server 1710 can access DB 1740 to verify an identity of MD 1110 and/or to verify an identity of a user of MD 1110. In one instance, verifying an identity of MD 1110 can include querying DB 1740 to determine a match of an identity of MD 1110 with at least a portion of information of a data structure of DB 1740. In s second instance, verifying an identity of a user of MD 1110 can include querying DB 1740 to determine a match of an identity of a user of MD 1110 with at least a portion of information of a data structure of DB 1740.

In a third instance, verifying an identity of MD 1110 can include receiving, via network 1420, a MAC address of MD 1110 when the MAC address is encrypted, and stored by MD 1110 before an authentication request is initiated, utilizing a private encryption key of the network provider. The encrypted MAC address can be decrypted utilizing a public encryption key of the network provider. In another instance, the encrypted MAC address can be encrypted utilizing a session encryption key for secure over-the-air transmission between MD 1110 and wireless AP 1210.

In one or more embodiments, an identity of a user of MD 1110 can include one or more of a username and a password, among others. In one or more embodiments, performing the authorization can include determining what an authenticated device and/or an authenticated user of a device can utilize, access, do, perform, etc. For example, a user profile and/or a subscriber profile, associated with a user of MD 1110, can include information that can be accessed and/or utilized in determining what an authenticated device and/or an authenticated user of a device can utilize, access, do, perform, etc.

In one or more embodiments, a response to the authentication and/or the authorization can be determined and can be provided to and/or obtained by access server 1710, as illustrated. In one example, the response can indicate that MD 1110 and/or a user of MD 1110 are/is authenticated. In another example, the response can indicate that MD 1110 and/or a user of MD 1110 are/is authorized to access network 1420. As shown, access server 1710 can permit, MD 1110, access of network 1420. In one or more embodiments, access server 1710 can provide one or more signals to NMD 1610 that can indicate that MD 1110 is permitted access of network 1420.

Figure 2E:
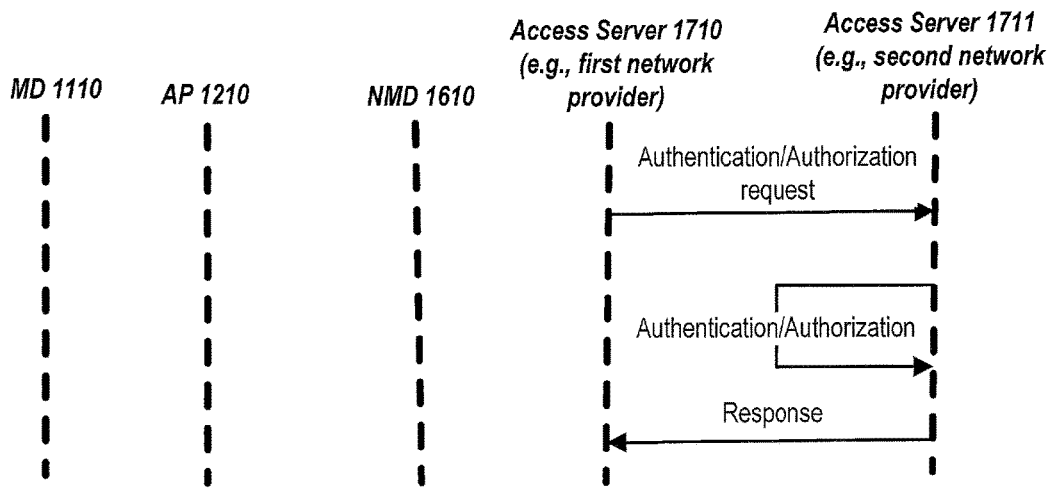

In one or more embodiments, FIG. 2E can be utilized in place of FIG. 2D. As illustrated in FIG. 2E, access server 1710 can provide an authentication and/or authorization request to access server 1711. For example, access server 1710 can be operated by a first network provider, and access server 1711 can be operated by a second, different, network provider. For instance, a user of MD 1110 can be a subscriber of the second network provider, and the first network provider can permit subscribers of the second network provider to roam on one or more networks operated by the first network provider, when the subscribers of the second network provider are authenticated and/or authorized to utilize one or more networks provided by the first network provider, one or more network services provided by the first network provider, and/or access of one or more network resources (e.g., access of network 1420 via one or more wireless APs) provided by the first network provider.

As shown, access server 1711 can perform an authentication and/or authorization based on the authentication/authorization request. In one or more embodiments, performing the authentication can include one or more of verifying an identity of MD 1110 and verifying an identity of a user of MD 1110, among others. For example, access server 1711 can access DB 1741 to verify an identity of MD 1110 and/or to verify an identity of a user of MD 1110. In one instance, verifying an identity of MD 1110 can include querying DB 1741 to determine a match of an identity of MD 1110 with at least a portion of information of a data structure of DB 1741. In another instance, verifying an identity of a user of MD 1110 can include querying DB 1741 to determine a match of an identity of a user of MD 1110 with at least a portion of information of a data structure of DB 1741. In one or more embodiments, an identity of a user of MD 1110 can include one or more of a username and a password, among others. In one or more embodiments, performing the authorization can include determining what an authenticated device and/or an authenticated user of a device can utilize, access, do, and/or perform, etc. For example, a user profile and/or a subscriber profile, associated with a user of MD 1110, can include information that can be accessed and/or utilized in determining what an authenticated device and/or an authenticated user of a device can utilize, access, do, perform, etc.

In one or more embodiments, access server 1710 can receive a response to the authentication and/or the authorization request, as illustrated. In one example, the response can indicate that MD 1110 and/or a user of MD 1110 are/is authenticated. In another example, the response can indicate that MD 1110 and/or a user of MD 1110 are/is authorized to access network 1420. In one or more embodiments, the response provided by access server 1711 can include configuration information such as a quality of service (QoS), an encryption key (e.g., the encryption key that can be utilized for communications between MD 1110 and wireless AP 1210), what the authenticated device and/or the authenticated user of the device can utilize, access, do, perform, etc.

Figure 2F:
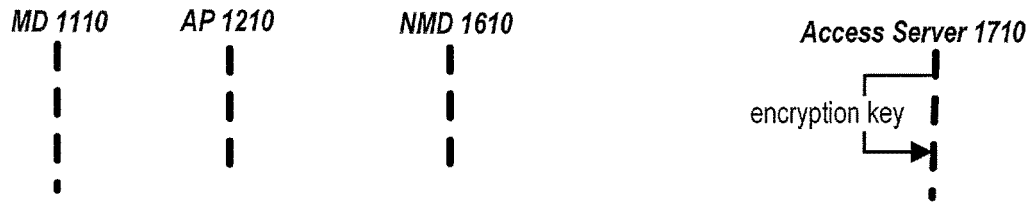

In one or more embodiments, FIG. 2F can be utilized when an encryption key (e.g., a PMK) is not provided by the MD or another network provider. As illustrated in FIG. 2F, access server 1710 can obtain an encryption key (e.g., the encryption key that can be used in secure communications between MD 1110 and wireless AP 1210). In one example, access server 1710 can obtain the encryption key from DB 1740. For instance, in obtaining the encryption key from DB 1740, access server 1710 can access a profile (e.g., that stores the encryption key) associated with MD 1110 and/or a user of MD 1110 that is stored by DB 1740. In another example, access server 1710 can obtain the encryption key via an encryption key generation system, process, and/or method. In one instance, access server 1710 can obtain the encryption key via a random number generation system, process, and/or method. In another instance, access server 1710 can obtain the encryption key via a cryptographic hash generation system, process, and/or method. In one or more embodiments, the encryption key can be utilized as a PMK for secure and/or encrypted wireless communications between MD 1110 and AP 1210.

Figure 2G:
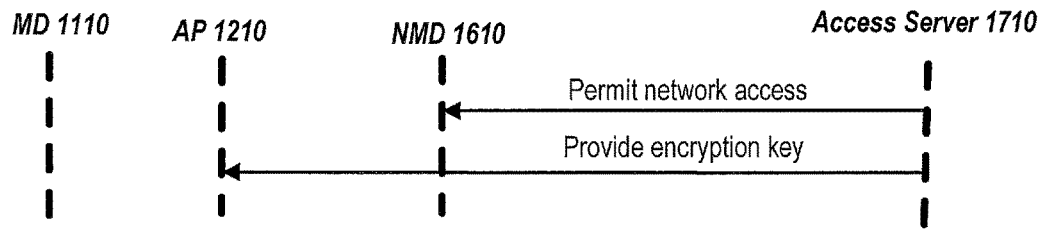

As shown in FIG. 2G, access server 1710 can permit, MD 1110, access of network 1420. In one or more embodiments, access server 1710 can provide one or more signals to NMD 1610 that can indicate that MD 1110 is permitted access of network 1420. As illustrated, access server 1710 can provide the encryption key to wireless AP 1210. In one example, the encryption key was obtained by MD 1110. In a second example, the encryption key was obtained by access server 1710. In another example, the encryption key was received from access server 1711.

Figure 2H:
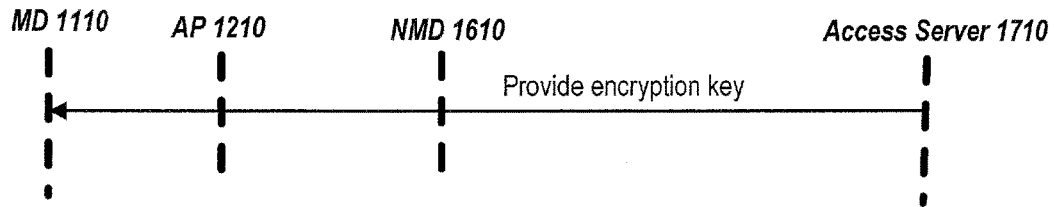

As illustrated in FIG. 2H, access server 1710 can provide the encryption key to MD 1110. For example, MD 1110 can utilize a client application, other than a web browser, and access server 1710 can provide the encryption key to the client application which can configure MD 1110 to utilize the encryption key provided by access server 1710. In one or more embodiments, access server 1710 can provide the encryption key to MD 1110 in a secure fashion. For example, access server 1710 can, utilizing another encryption key, encrypt the encryption key and can provide the encryption key to MD 1110 in a secure fashion via the other encryption key. For one instance, MD 1110 can store the other encryption key and can decrypt the encryption key provided by access server 1710.

Figure 2I:
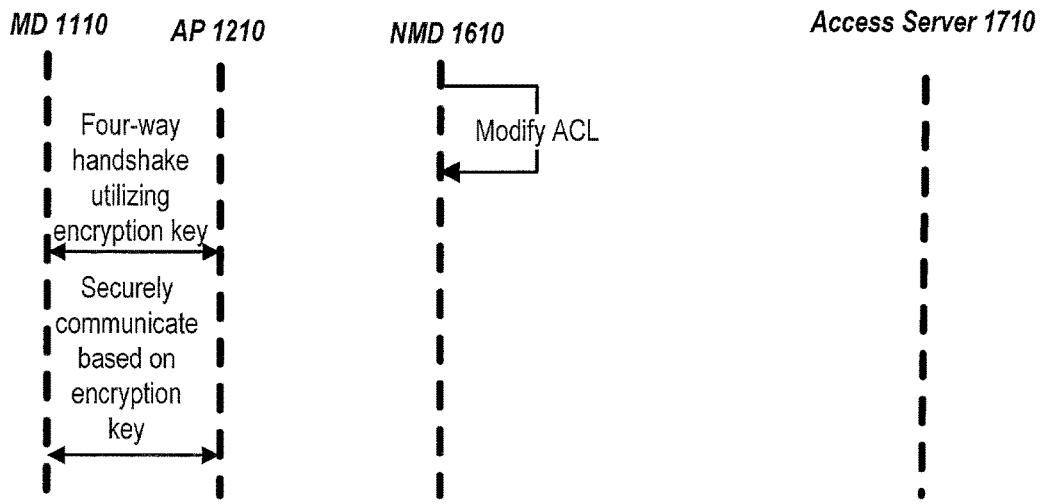

As shown in FIG. 2I, NMD 1610 can modify an ACL based on the one or more signals from access server 1710. For example, NMD 1610 can modify an ACL such that MD 1110 is permitted access of network 1420, access of one or more services of network 1420, and/or access of one or more resources of network 1420. As illustrated, MD 1110 and AP 1210 can perform a four-way handshake utilizing the encryption key. Further information regarding the four-way handshake utilizing the encryption key is provided with regard to FIG. 2J. As illustrated, MD 1110 and AP 1210 can securely wirelessly communicate, based on the encryption key, with each other. In one example, one or more secure wireless communications from wireless AP 1210 to MD 1110, that include one or more unicast IP communications that are addressed to MD 1110 and not addressed to any of MDs 1111-1113, may not be monitored by one or more of MDs 1111-1113. In another example, one or more secure wireless communications from MD 1110 to network 1420 via wireless AP 1210, that include one or more unicast IP communications that are addressed to a computer system coupled to network 1420 and not addressed to any of MDs 1111-1113, may not be monitored by one or more of MDs 1111-1113.

In one or more embodiments, two or more of the devices included in FIGS. 2A-2I can be combined or can be included in a single device. In one example, NMD 1610 and wireless AP 1210 can be combined. For instance, the functionality of wireless AP 1230 can be described with reference to both NMD 1610 and wireless AP 1210 as though both NMD 1610 and wireless AP 1210 were included in wireless AP 1230. In another example, NMD 1610 and access server 1710 can be combined or included in a single device.

In one or more embodiments, other devices can be utilized in FIGS. 2A-2J. In one example, one of MDs 1111-1143 can be utilized were MD 1110 is utilized. In a second example, one of wireless APs 1211-1240 can be utilized were wireless AP 1210 is utilized. In another example, NMD 1611 can be utilized were NMD 1610 is utilized. In one or more embodiments, one or more methods and/or processes described with reference to FIGS. 2A-2J can be repeated with same and/or different devices.

Figure 2J:
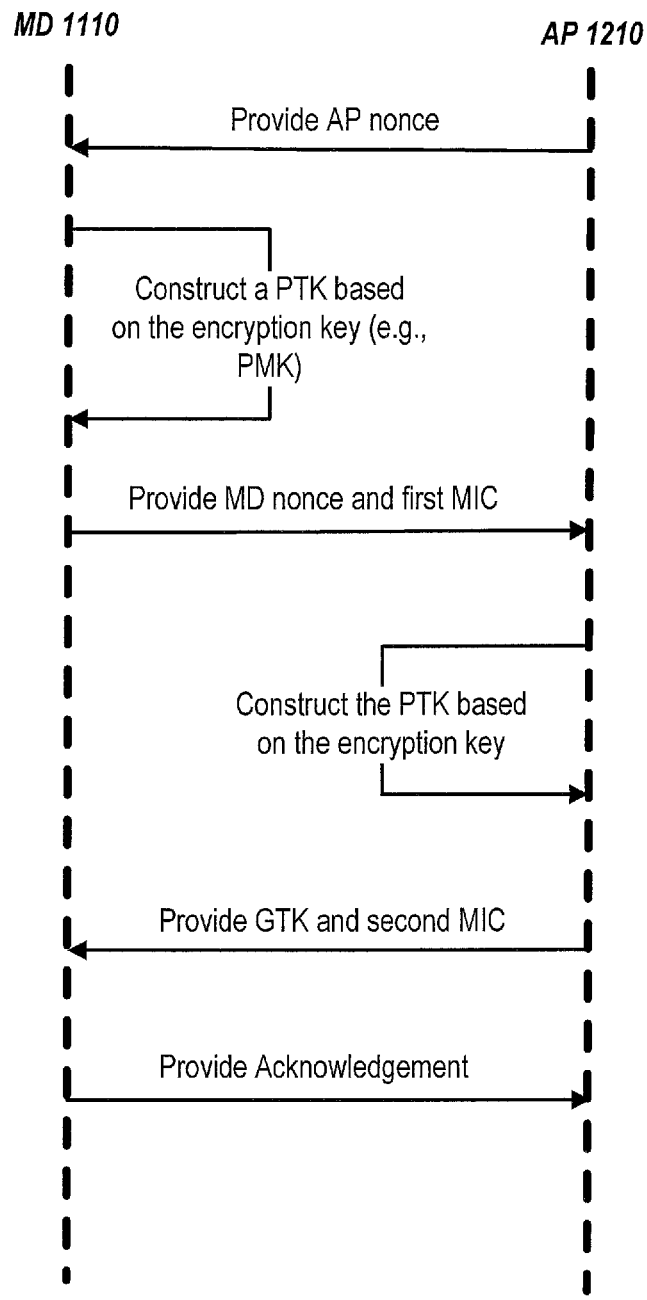
FIG. 2J provides an exemplary sequence diagram of a four-way handshake between a mobile device and a wireless access point, according to one or more embodiments.

Turning now to FIG. 2J, an exemplary sequence diagram of a four-way handshake between a mobile device and a wireless access point is illustrated, according to one or more embodiments. As illustrated, AP 1210 can provide an AP nonce to MD 1110. In one or more embodiments, a nonce can be an abbreviation for a number used once. In one example, a nonce can include a random or pseudo-random number. For instance, the nonce can be utilized in an authentication system, protocol, process, and/or method to avert reuse of previously used communications and/or to avert a replay attack.

As shown, MD 1110 can construct a PTK based on the encryption key that was previously provided to or obtained by access server 1710. In one or more embodiments, the encryption key can be or include a PMK. As illustrated, MD 1110 can provide a MD nonce and a first message integrity code (MIC) to AP 1210. In one or more embodiments, a MIC can be or include a message authentication code that can be utilized to validate and/or verify an authenticity of a message. For instance, the MIC can be produced from a hash function (e.g., a cryptographic hash function) of the message and one or more of a shared secret and other data (e.g., a nonce, a timestamp, etc.).

As illustrated, AP 1210 can construct the PTK based on the encryption key that was previously provided to AP 1210 by access server 1710. As shown, AP 1210 can provide a group transient key (GTK) and a second MIC to MD 1110. In one or more embodiments, the GTK can be utilized in broadcast and/or multicast communications. As illustrated, MD 1110 can provide an acknowledgement (ACK) to AP 1210.

Figure 3:
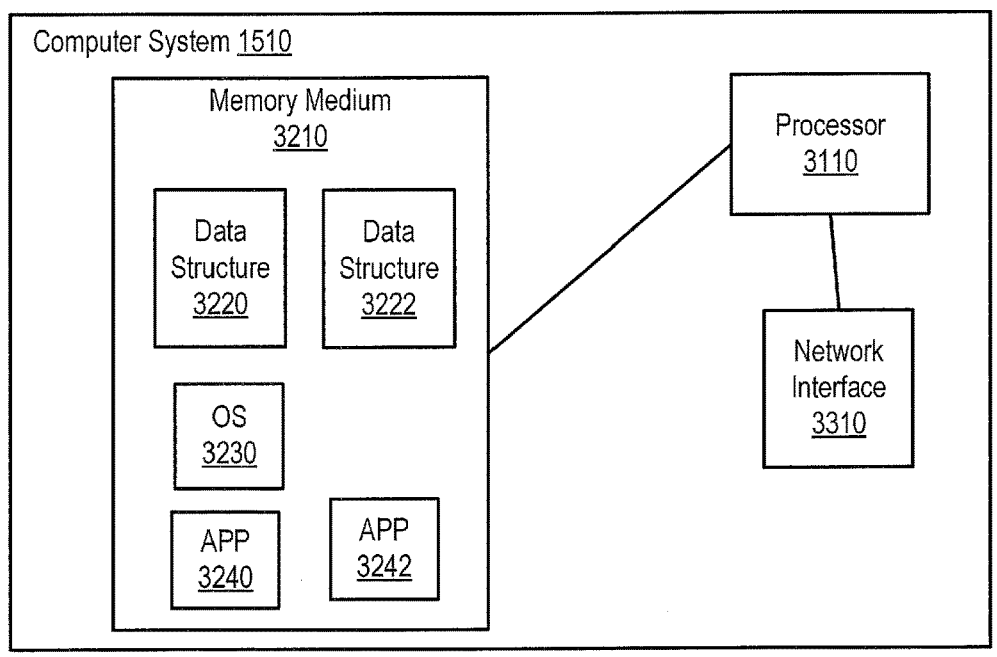
FIG. 3 provides block diagram of a computer system, according to one or more embodiments.

Turning now to FIG. 3, a block diagram of a computer system is illustrated, according to one or more embodiments. As shown, CS 1510 can include a memory medium 3210 coupled to a processor 3110, and computer system 1510 can include a network interface 3310. In one or more embodiments, memory medium 3210 can include one or more data structures 3220 and 3222, one or more applications (APPs) 3240 and 3242, and/or an operating system (OS) 3230 that can include instructions executable by processor 3110 and/or data to implement one or more methods and/or one or more systems associated with computer system 1510. In one or more embodiments, computer system 1510 may be any of various types of devices, including a server computer system, a networking appliance, and/or a core network server such as a HLR or a home subscriber server (HSS), among others. In one or more embodiments, processor 3110 can include one or more cores, and each core of processor 3110 can implement an instruction set architecture (ISA). In one or more embodiments, one or more of access servers 1710-1712 and computer systems 1511 and 1512 can include same or similar structures and/or functionality as described with reference to computer system 1510.

Figure 4:
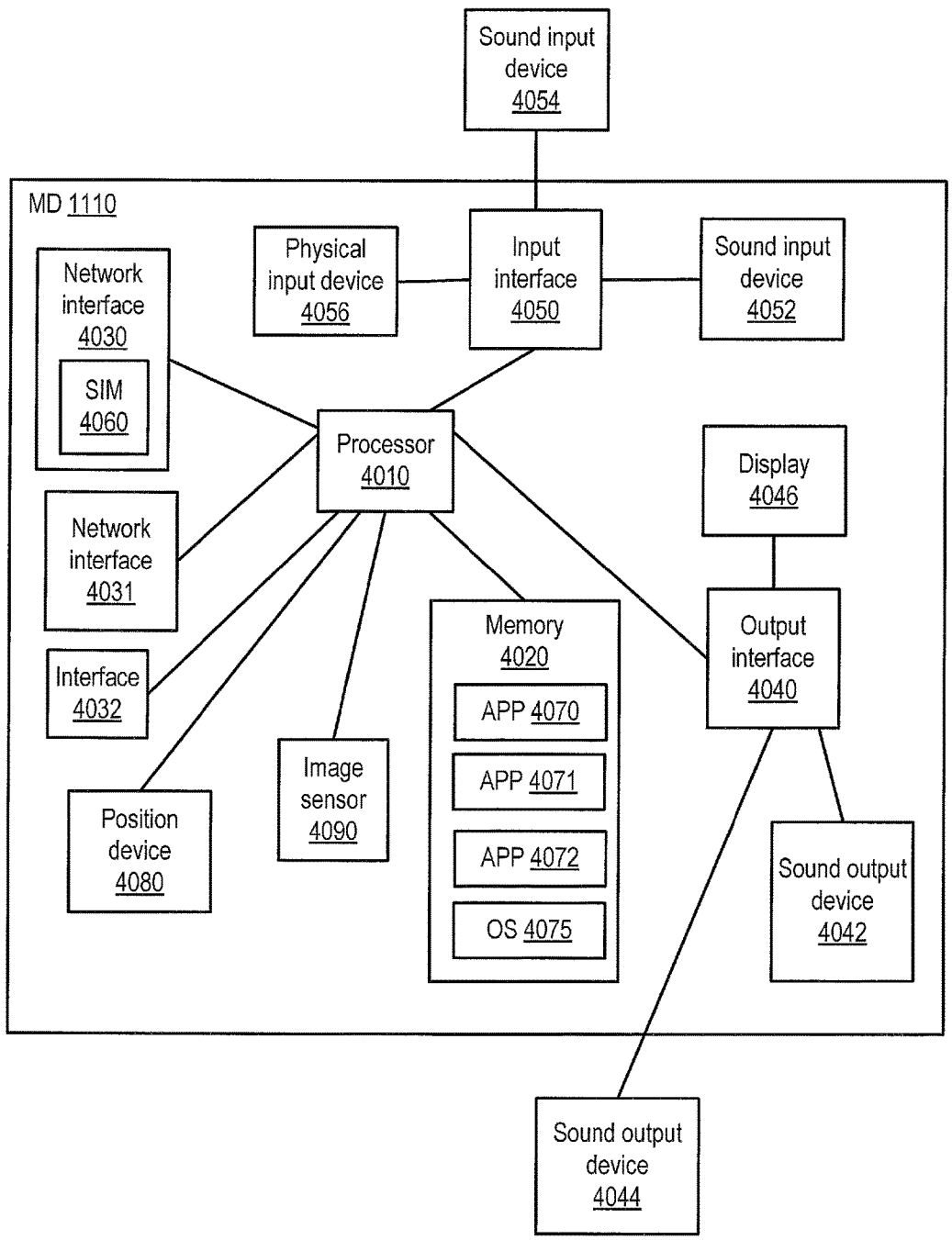
FIG. 4 provides a block diagram of a mobile device, according to one or more embodiments.

Turning now to FIG. 4, a block diagram of a mobile device is illustrated, according to one or more embodiments. As shown, MD 1110 can include a memory medium 4020 coupled to a processor 4010, and MD 1110 can include one or more network interfaces 4030 and 4031, interface 4032, a user output interface 4040, a user input interface 4050, a position device 4080, and an image sensor 4090, among others, coupled to processor 4010. In one or more embodiments, memory medium 4020 can include one or more applications (APPs) 4070-4072 and/or an OS 4075 that can include instructions executable by processor 4010 to implement one or more methods and/or one or more systems associated with MD 1110. In one example, APP 4070 can include a web browser. In another example, APP 4071 can include a client application that is different from a web browser. In one or more embodiments, MD 1110 may be any of various types of devices, including a computer system, such as a portable computer, a tablet computing device, a laptop computing device, a notebook computing device, a personal digital assistant (PDA), a mobile wireless telephone (e.g., a cellular telephone, a satellite telephone, etc.), a wearable computing device, an Internet appliance, a communications device, a handheld mobile computing device, or other wired or wireless device. In one or more embodiments, processor 4010 can include one or more cores, and each core of processor 4010 can implement an ISA.

In one or more embodiments, user output interface 4040 can be used to convey information (e.g., text, graphic, video, haptic, audio, etc.) to a user of MD 1110. For example, MD 1110 may include a display 4046 (e.g., a display screen) coupled to output interface 4040 that can be used to convey text, graphic, image, motion picture, and/or video information to a user of MD 1110. In one or more embodiments, MD 1110 can include a sound output device 4042 coupled to user output interface 4040. In one or more embodiments, sound output device 4042 can include a device and/or circuitry that can produce one or more sounds.

In one or more embodiments, user output interface 4040 can be coupled to a sound output device 4044. In one instance, sound output device 4044 can include one or more of an amplifier and/or a speaker. In another instance, sound output device 4044 can include one or more earphones. In one or more embodiments, user output interface 4040 can be coupled to sound output device 4044 in a wired fashion. In one or more embodiments, user output interface 4040 can be coupled to sound output device 4044 in a wireless fashion. In one example, user output interface 4040 can communicate sound information to output device 4044 using an ISM band. For instance, user output interface 4040 can communicate sound information to sound output device 4044 using one or more of a personal area network (PAN), IEEE 802.15, IEEE 802.15.4, ZigBee, 6LoWPAN, frequency modulation of a carrier wave, amplitude modulation of a carrier wave, light signals, and serial pulses, among others. In one or more embodiments, sound output device 4044 can be or be included in a device that includes an IEEE 802.15 receiver or transceiver, such as a Bluetooth headset or earpiece.

In one or more embodiments, user input interface 4050 can be used to receive sounds from a user of MD 1110. In one example, MD 1110 can include a sound input device 4052 coupled to user input interface 4050. In one instance, sound input device 4052 can include a microphone. In another example, a sound input device 4054 coupled to user input interface 4050. In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 4050 can be coupled to sound input device 4054 in a wired fashion. In one or more embodiments, user input interface 4050 can be coupled to sound input device 4054 in a wireless fashion. In one example, user input interface 4050 can communicate sound information to sound input device 4054 using an ISM band. For instance, sound input device 4054 can communicate sound information to user input interface 4050 using one or more of a PAN, IEEE 802.15, IEEE 802.15.4, ZigBee, 6LoWPAN, frequency modulation of a carrier wave, amplitude modulation of a carrier wave, light signals, and serial pulses, among others. In one or more embodiments, sound input device 4054 can be or be included in a device that includes an IEEE 802.15 transmitter or transceiver, such as a Bluetooth headset or microphone.

In one or more embodiments, user input interface can be used to receive user input from a user of MD 1110. In one example, MD 1110 can include a physical input device (e.g., a keyboard) coupled to input interface 4050 that can be used to receive user input from a user of MD 1110. In another example, MD 1110 may include one or more sensors that can be used to receive user input from a user of MD 1110. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 4040 and user input interface 4050 can be used to implement a keyboard. For example, user output interface 4040 can be used to present an image of a keyboard, and user input interface 4050 can receive a position of user input on the image of the keyboard to determine a received key of the keyboard.

In one or more embodiments, network interface 4030 can include a transceiver that is operable to communicate information with a wireless telephony network. In one or more embodiments, network interface 4030 can be used to couple MD 1110 to the wireless telephony network, and MD 1110 can use network interface 4030 to communicate information (e.g., data, voice data, etc.) with the wireless telephony network. In one or more embodiments, network interface 4030 can include a SIM 4060. In one or more embodiments, SIM 4060 can securely store an international mobile subscriber identity (IMSI) which can include a unique number and/or identity associated with a global system for mobile communications (GSM) network and/or a universal mobile telecommunications system (UMTS) network, which can be or be included in the wireless telephony network. In one example, the unique number and/or identity can be used to determine information corresponding to MD 1110 from a HLR, a HSS, and/or from a VLR. In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS mobile network, which can be or be included in the wireless telephony network. For example, the MSISDN can include a telephone number corresponding to SIM 4060. In one instance, the MSISDN can include a country code, a national destination code, and a subscriber number. In another instance, the MSISDN can include a country code, a number planning area, and a subscriber number.

In one or more embodiments, SIM 4060 can be embodied in a removable card (e.g., a SIM card) that can be removed from a first MD associated with a first subscriber account and placed in a second MD, so that the second MD can be associated with the first subscriber account. For example, SIM 4060 embodied as a SIM card can be associated with a first subscriber account and used in MD 1110, thereby associating MD 1110 with the first subscriber account; SIM 4060 can be removed from MD 1110, thereby disassociating MD 1110 with the first subscriber account; and SIM 4060 can be placed in MD 1121, thereby associating MD 1121 with the first subscriber account.

In one or more embodiments, network interface 4031 can be used to communicate with one or more wireless APs. In one example, network interface 4031 can be configured and used to communicate with wireless AP 1210 in a wireless fashion. In one or more embodiments, network interface 4031 can include a transceiver that is operable to communicate information with one or more wireless APs.

In one or more embodiments, interface 4032 can be used to communicate with one or more other MDs. In one example, interface 4032 can be used to communicate with one or more other MDs in a wired fashion. For instance, interface 4032 can communicate with another MD using USB, Ethernet, FireWire (i.e. IEEE 1394), RS-232, serial peripheral interconnect, or inter-integrated circuit, among others. In another example, interface 4032 can be used to communicate with one or more other MDs in a wireless fashion. For instance, interface 4032 can communicate with another MD using Bluetooth, IEEE 802.11, IEEE 802.15, IEEE 802.15.4, 6LoWPAN, ZigBee, or infrared signaling, among others.

In one or more embodiments, MD 1110 can include a position device 4080 coupled to processor 4010. In one example, position device 4080 can include a GPS receiver. In another example, position device 4080 can include a terrestrial radio navigation system receiver such as LORAN (LOng RAnge Navigation). In one or more embodiments, position device 4080 can provide one or more services such as one or more of positioning, navigation, and timing to processor 4010. For example, a positioning service can provide one or more of latitude information, longitude information, altitude information, and accuracy information (e.g., a radius of uncertainty for a geographic location or position).

In one or more embodiments, position device 4080 can provide heading information. For example, position device 4080 can include a compass and/or implement a compass to provide heading information. In one or more embodiments, position device 4080 can provide device position information such as tilt and/or angle information. For example, position device 4080 can include one or more of an accelerometer and an electronic gyroscope. In one or more embodiments, the compass can be electronically gimbaled using one or more of an accelerometer and an electronic gyroscope.

In one or more embodiments, electronic image sensor 4090 can provide digital data of one or more of an image, a motion picture, and a video. For example, electronic image sensor 4090 can be or include a digital camera. In one or more embodiments, the digital data of one or more of an image, a motion picture, and a video can include one or more formats. For example the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, among others. In one or more embodiments, one or more of MDs 1111-1143 can include same and/or similar structures and/or functionalities as described with reference to MD 1110.

Figure 5:
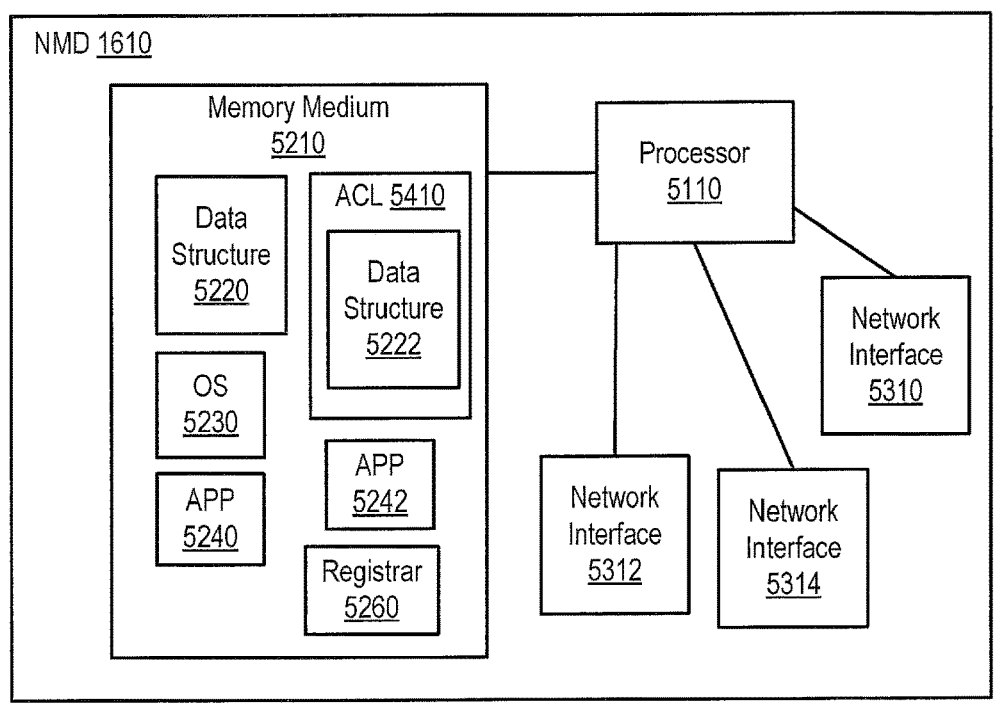
FIG. 5 provides a block diagram of a network management device, according to one or more embodiments.

Turning now to FIG. 5, a block diagram of a network management device is illustrated, according to one or more embodiments. As shown, NMD 1610 can include a memory medium 5210 coupled to a processor 5110, and NMD 1610 can include one or more network interfaces 5310-5314 coupled to processor 5110. In one or more embodiments, one or more of network interfaces 5310-5314 can be coupled to one or more of network 1420 and wireless APs 1210-1220. In one example, a network interface can implement an Ethernet interface. In one instance, the Ethernet interface can be configured to be coupled to a gateway device, where the gateway device is configured to be coupled to network 1420. In another instance, the Ethernet interface can be configured to be coupled to one or more of wireless APs 1210-1220. In a second example, a network interface can implement a WiMAX (e.g., IEEE 802.16) network interface that is configured to be coupled to a WiMAX access point that is configured to be coupled to network 1420. In a third example, a network interface can implement a T-1 network interface that is configured to be coupled to network 1420. In another example, a network interface can implement a T-1 network interface that is configured to be coupled one or more of wireless APs 1210-1220. As shown, memory medium 5210 can include an ACL 5410, one or more data structures 5220 and 5222, one or more APPs 5240 and 5242, a registrar 5250, and/or an OS 5230 that can store data and/or instructions executable by processor 5110 to implement one or more systems, processes, and/or methods described herein.

Figure 8:
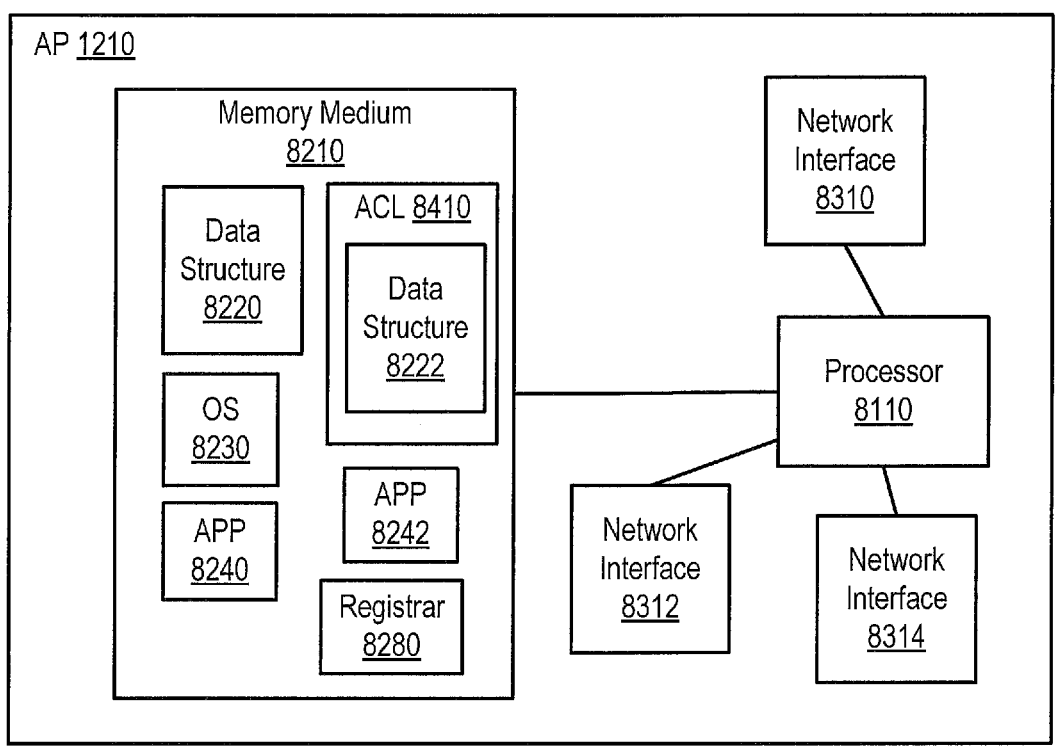
FIG. 8 provides a block diagram of a wireless access point, according to one or more embodiments.

In one or more embodiments, NMD 1610 can control and/or configure one or more of wireless APs 1210-1220. For example, NMD 1610 can use registrar 5260 to control and/or configure one or more of wireless APs 1210-1220. For instance, registrar 5260 can process an enrollee (e.g., a MD, a wireless AP, etc.), can implement at least a portion of a registration protocol (RP) (e.g., a WPS RP), can receive tokens from one or more network providers, and configure a wireless AP with configuration information (e.g., MAC address, encryption key, etc.) associated with an enrollee. In one or more embodiments, the RP can utilize an extensible authentication protocol (EAP). For example, the RP can be utilized in exchanging multiple EAP messages between a registrar (e.g., NMD 1610 executing registrar 5260, wireless AP 1210 executing registrar 8260 as illustrated in FIG. 8, etc.) and an enrollee (e.g., one of MDs 1110-1115, and APs 1210-1220).

Figure 6:
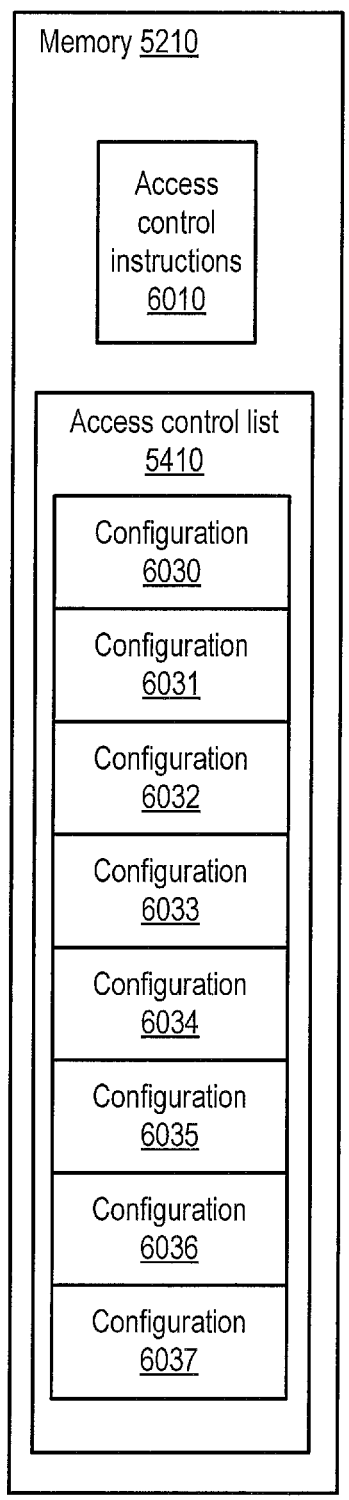
FIG. 6 provides a block diagram of a memory of a network management device, according to one or more embodiments.

Turning now to FIG. 6, a block diagram of a memory of a network management device is illustrated, according to one or more embodiments. As shown, memory 5210 can include access control instructions 6010 that can be executed by processor 5110. For example, access control instructions 6010 that can be executed on processor 5110 to control access to and/or services of network 1420 for computing devices (e.g., MDs 1110-1115) coupled to one or more of wireless APs 1210-1220. In one or more embodiments, ACL 5410 can be used by NMD 1610 to control access to and/or services of network 1420 for computing devices coupled to one or more of wireless APs 1210-1220.

In one or more embodiments, ACL 5410 can be used by access control instructions 6010 executed on processor 5110 to control outbound network access (e.g., access from one or more MDs coupled to one or more of wireless APs 1210-1220 to network 1420) and/or inbound network access (e.g., access from network 1420 to one or more MDs coupled to wireless APs 1210-1220) using source and/or destination network addresses. For example, ACL 5410 can be used to control outbound network access and/or inbound network access on a packet level (e.g., on a per packet basis). In one or more instances, ACL 5410 can be used to control outbound network access and/or inbound network access on one or more of an IP packet level, a TCP packet level, and/or a UDP packet level.

As shown, ACL 5410 can include one or more configurations 6030-6037. For example, configuration 6030 can be associated with one or more network addresses (e.g., IP addresses, MAC addresses, etc.), and configuration 6030 can include data that can be used to control access of MD 1110 to network 1420. In one or more embodiments, configuration 6030 can include one or more data structures that can be used to store and/or retrieve the data that can be used to control access of MD 1110 to network 1420.

Turning now to FIG. 7, a block diagram of an access control list configuration is illustrated, according to one or more embodiments. As illustrated, configuration 6030 can include source address information 7010-7015 that corresponds to respective destination information 7020-7027 that corresponds to respective service information 7030-7035 that corresponds to respective direction information 7040-7045 that corresponds to respective permission information 7050-7055. In one or more embodiments, source address information 7010-7015 and destination information 7020-7025 can be used to control outbound network access (e.g., access from one or more MDs coupled to one or more wireless APs 1210-1220 to network 1420) and/or inbound network access (e.g., access from network 1420 to one or more MDs coupled to one or more wireless APs 1210-1220).

In one example, source address information 7010 can store address information associated with MD 1110, and direction information 7040 can indicate an outbound traffic direction (e.g., outbound from one or more MDs, coupled to one or more wireless APs 1210-1220, to network 1420). In one instance, source address information 7010 can store IP address information associated with MD 1110. In another instance, source address information 7010 can store MAC address information associated with MD 1110. In another example, destination address information 7020 can store address information associated one or more network addresses of network 1420. In one instance, destination address information 7020 can store IP address information. For example, address information 7020 can include a range of addresses, such as a subnet (e.g., 216.12.254.128/25) and/or addresses 216.9.25.3 through 216.10.25.5, a single network address, such as 216.12.254.7, and/or a set of addresses, such as {216.12.254.4, 209.191.93.52, 216.12.252.42, 96.17.249.145}, among others.

In one or more embodiments, MD 1110 can access network addresses of network 1420 that are associated with destination address information 7020. In one or more embodiments, destination address information 7020 can store information that indicates that MD 1110 is not restricted to any particular network address of network 1420. For example, destination address information may store 0.0.0.0 to indicate that MD 1110 is not restricted to any particular network address of network 1420.

In one or more embodiments, service information 7030 can be used to control one or more services associated with source address information 7010 and/or destination address information 7020. In one or more examples, service information 7030 can indicate one or more services of email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, these one or more services can be associated with and/or correspond to one or more protocols of one or more computer and/or software applications.

In one or more embodiments, a service can be associated with a port (e.g., a port number). For example, a world wide web service using a HTTP can use port 80. For instance, the HTTP can be used with a TCP that can use port 80. In one or more embodiments, "well known ports" can be those from 0 through 1023, "registered ports" can be those from 1024 through 49151, and/or "dynamic and/or private ports" can be those from 49151 through 65535. More information regarding port numbers can be found in Request for Comment (RFC) 1700 maintained by and available from a working group of the Internet Engineering Task Force (IETF), a standards organization for the Internet.

In one or more embodiments, service information 7030 can indicate that any service can be used with source address information 7010 and/or destination address information 7020. In one or more embodiments, service information 7030 can indicate that specific one or more services can be used with source address information 7010 and/or destination address information 7020. In one example, service information 7030 can indicate that a domain name service can be used with source address information 7010 and/or destination address information 7020. In another example, service information 7030 can indicate that a world wide web service can be used with source address information 7010 and/or destination address information 7020.

In one or more embodiments, destination address information 7021 can store address information associated with MD 1110, and direction information 7041 can indicate an inbound traffic direction (e.g., inbound from network 1420 to one or more MDs coupled to one or more wireless APs 1210-1220 to network 1420). In one instance, destination address information 7021 can store IP address information associated with MD 1110. In another instance, destination address information 7021 can store MAC address information associated with MD 1110. In one example, source address information 7011 can store address information associated one or more network addresses of network 1420. In one instance, source address information 7011 can store IP address information. For example, address information 7011 can include a range of addresses, such as a subnet (e.g., 216.12.254.128/25) and/or addresses 216.9.25.3 through 216.10.25.5, a single network address, such as 216.12.254.7, and/or a set of addresses, such as {216.12.254.4, 209.191.93.52, 216.12.252.42, 96.17.249.145}, among others.

In one or more embodiments, one or more computer systems with associated with source address information 7011 can communicate with MD 1110. In one or more embodiments, source address information 7011 can store information that indicates that one or more computer systems associated with addresses of network 1420 are not restricted to any particular network address of network 1420. For example, source address information 7011 may store 0.0.0.0 to indicate that one or more computer systems associated with addresses of network 1420 are not restricted to any particular network address of network 1420.

In one example, service information 7031 can indicate a VoIP service. For instance, source address information 7011, destination address information 7021, service information 7031, and direction information 7041 can be used to control access of the VoIP service to MD 1110. For example, source address information 7011, destination address information 7021, service information 7031, and direction information 7041 can be used to control incoming VoIP calls to MD 1110.

In one or more embodiments, NMD 1610 can use permission information 7050 to control whether or not network communications (e.g., network packets) associated with source address information 7010, destination address information 7020, service information 7030, and direction information 7040 is permitted. Further, NMD 1610 can use permission information 7051 to control whether or not network communications (e.g., network packets) associated with source address information 7011, destination address information 7021, service information 7031, and direction information 7041. In the fashion described above, NMD 1610 can control access to/from and/or services of network 1420 for one or more MDs coupled to one or more wireless APs 1210-1220 to network 1420 by controlling control access to/from and/or services corresponding to one or more network addresses of network 1420, according to one or more embodiments.

In one or more embodiments, NMD 1610 and/or another computer system coupled to network 1420 can modify configuration 6030 to control access to/from and/or services of network 1420 for one or more MDs coupled to one or more wireless APs 1210-1220 to network 1420 by using NMD 1610 and ACL 5410 to control access to/from and/or services corresponding to one or more network addresses of network 1420. In one or more embodiments, one or more portions of ACL 5410 can be stored in a first data structure (e.g., data structure 5220). In one or more embodiments, one or more portions of ACL 5410 can be used to populate a second data structure (e.g., data structure 5222). For example, the second data structure can be populated with information from ACL 5410 in a fashion usable by access control instructions 6010 when executed by processor 5110. In one or more embodiments, the second data structure can be considered an access control list.

In one example, NMD 1610 can permit MD 1110 access to some services and/or network addresses of network 1420 using ACL 5410 and can modify ACL 5410 to permit MD 1110 access to additional services and/or network addresses of network 1420. For instance, NMD 1610 can permit MD 1110 to access a "walled garden" that can include access to one or more domain name services (e.g., provided by one or more domain name servers) and/or one or more web servers (e.g., one or more web servers that can perform network access services, one or more web servers that can provide information regarding location 1010, etc.). In one or more embodiments, a configuration of ACL 5410 can include the walled garden.

In a second example, MD 1110 can be permitted access to some services and/or network addresses of network 1420, and NMD 1610 can reduce or eliminate access to one or more services and/or network addresses of network 1420 using ACL 5410 by modifying ACL 5410 to reduce or eliminate access to one or more services and/or network addresses of network 1420 previously permitted to MD 1110. In one or more embodiments, NMD 1610 can receive one or more signals from a remote computing device and can, in response, permitted additional access or reduce or eliminate access to some services and/or network addresses of network 1420. For example, NMD 1610 can receive the one or more signals via network 1420.

Turning now to FIG. 8, a block diagram of a wireless access point is illustrated, according to one or more embodiments. As shown, wireless AP 1210 can include a memory medium 8210 coupled to a processor 8110, and wireless AP 1210 can include one or more network interfaces 8310-8314 coupled to processor 8110.

In one or more embodiments, a network interface (e.g., a network interface from network interfaces 8310-8314) can be coupled to network 1420 or NMD 1610. In one example, a network interface can implement an Ethernet interface. For instance, the Ethernet interface can be configured to be coupled to a gateway device, where the gateway device is configured to be coupled to network 1420. In a second example, a network interface can implement a WiMAX (e.g., IEEE 802.16) network interface that is configured to be coupled to a WiMAX access point that is configured to be coupled to network 1420. In another example, a network interface can implement a T-1 network interface that is configured to be coupled to network 1420. In one or more embodiments, a network interface (e.g., a network interface from network interfaces 8310-8314) can be coupled to one or more MDs in a wireless fashion. In one example, network interface 8312 can implement a Wi-Fi (e.g., IEEE 802.11) network interface that can wirelessly communicate with one or more MDs. In another example, network interface 8314 can implement WiMAX interface that can wireless communicate with one or more MDs.

As shown, memory medium 8210 can include an ACL 8410, one or more data structures 8220 and 8222, one or more APPs 8240 and 8242, a registrar 8260, and/or an OS 8230 that can store data and/or instructions executable by processor 8110 to implement one or more systems, processes, and/or methods described herein. In one or more embodiments, wireless AP 1210 can include same and/or similar structures and/or functionalities as described with reference to NMD 1610. In one example, AP 1210 can include and control an ACL in a similar fashion as described with reference to NMD 1610. In another example, AP 1210 can include and control a registrar in a similar fashion as described with reference to NMD 1610. In one or more embodiments, one or more of APs 1211, 1220, 1230, and 1240 can include same and/or similar structures and/or functionalities as described with reference to AP 1210.

Figure 9:
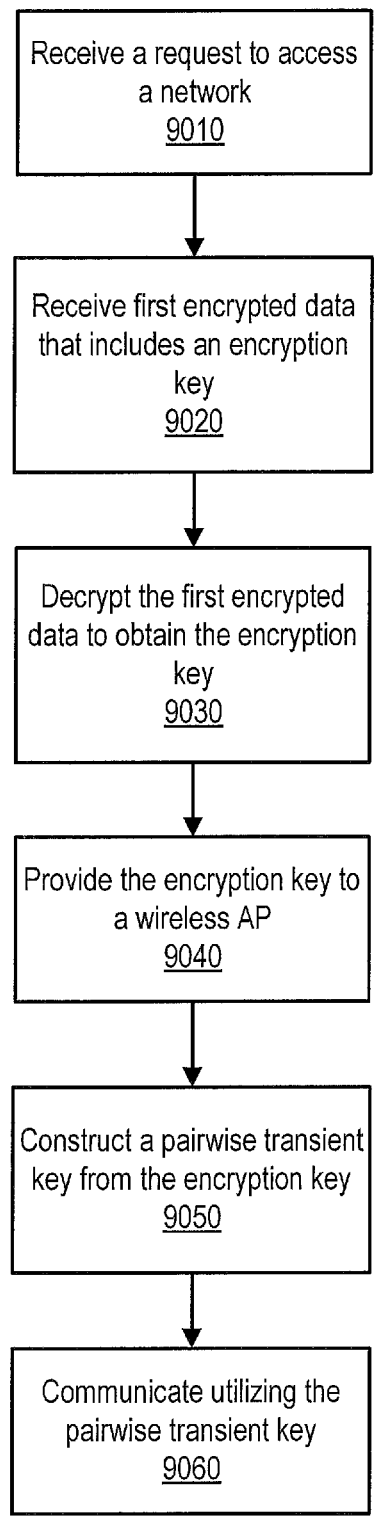
FIG. 9 illustrates a method of configuring a wireless access point, according to one or more embodiments.

Turning now to FIG. 9, a method of configuring a wireless access point is illustrated, according to one or more embodiments. At 9010, a request to access a network can be received. For example, the request to access the network can include a request to access one or more network services and/or one or more network resources provided by and/or associated with network 1420. For instance, NMD 1610 can receive, from MD 1110 coupled to WLAN 1431 (e.g., a first network), a request to access network 1420 (e.g., a second network). In one or more embodiments, the request to access the network can be received via an unsecured wireless communication from a MD to a wireless AP.

At 9020, first encrypted data that includes an encryption key can be received. In one or more embodiments, the first encrypted data can also include one or more of a username, a password, a MAC address, an IP address, and a telephone identification (e.g., an IMSI, a MSISDN, a portion of a MSISDN, etc.), among others, that can be used to verify and/or authenticate an identity of a device (e.g., a MD from MDs 1110-1143), an identity of a user of a device, etc. In one example, the first encrypted data that includes the encryption key can be received from a MD (e.g., a MD from MDs 1110-1143) via an unsecured wireless communication from the MD to the wireless AP (e.g., an in-band communication). For instance, access server 1710 can receive the first encrypted data that includes the encryption key via an unsecured wireless communication from the MD to the wireless AP. In one or more embodiments, the unsecured wireless communication from the MD to the wireless AP can include one or more unsecured link layer communications from the MD to the wireless AP. In second example, access server 1710 can receive the first encrypted data that includes the encryption key from a database (e.g., DB 1740). In another example, access server 1710 can receive the first encrypted data that includes the encryption key from access server 1711.

In one or more embodiments, the first encrypted data that includes the encryption key can be encrypted via a TLS, a HTTPS, a VPN, IPsec, and/or a SSL, among others. In one example, the encryption key can be received via TLS (e.g., encrypted communication via a transport layer security) and via an unsecured link layer coupling the MD and the wireless AP. In another, example, web interface 1720 can implement and/or include a secure web server that can communication via HTTPS, and web interface 1720 can receive the first encrypted data that includes the encryption key via HTTPS. For instance, the first encrypted data can be encrypted via a public encryption key of the secure web server implemented by and/or included in web interface 1720.

In one or more embodiments, the request to access the network can include the first encrypted data that includes the encryption key. For example, functionality associated with method element 9010 can include functionality associated with method element 9020. At 9030, the first encrypted data that includes the encryption key can be decrypted to obtain the encryption key. For example, access server 1710 can decrypt the first encrypted data that includes the encryption key. For instance, the first data can be encrypted via a public encryption key, and access server 1710 can decrypt the first encrypted data via a private encryption key, associated with and/or paired with the public encryption key, to obtain the encryption key.

In one or more embodiments, access server 1710 can include and/or implement a secure web server that can receive the first encrypted data that includes the encryption key via HTTP S. For example, web interface 1720 can implement and/or include the secure web server that can decrypt the first encrypted data that includes the encryption key. For instance, the first data can be encrypted via a public encryption key associated with the secure web server, and the secure web server can decrypt the first encrypted data via a private encryption key, associated with and/or paired with the public encryption key, to obtain the encryption key.

At 9040, the encryption key can be provided to the wireless AP. In one or more embodiments, the encryption key can be or include a PMK. For example, access server can provide the encryption key (e.g., the PMK) to wireless AP 1210. In one or more embodiments, the encryption key can be provided to multiple wireless APs. For example, the encryption key can be provided to wireless APs 1210 and 1211. At 9050, a PTK can be constructed based on the encryption key. For example, wireless AP 1210 can construct the PTK based on the encryption key (e.g., the PMK).

At 9060, the wireless AP and the MD can communicate utilizing the PTK. In one example, the MD can encrypt second data via the PTK and can provide second encrypted data to the wireless AP, and the wireless AP can receive the second encrypted data and can decrypt the second encrypted data, via the PTK, to obtain the second data. In another example, the wireless AP can encrypt third data via the PTK and can provide third encrypted data to the MD, and the MD can receive the third encrypted data and can decrypt the third encrypted data, via the PTK, to obtain the third data. In one or more embodiments, one or more of MDs 1111-1113 can monitor the second encrypted data and/or the third encrypted data, and one or more of MDs 1111-1113 may not determine or decrypt the second data or the third data, since the one or more of MDs 1111-1113 do not have access to the encryption key (e.g., the PMK).

Figure 10:
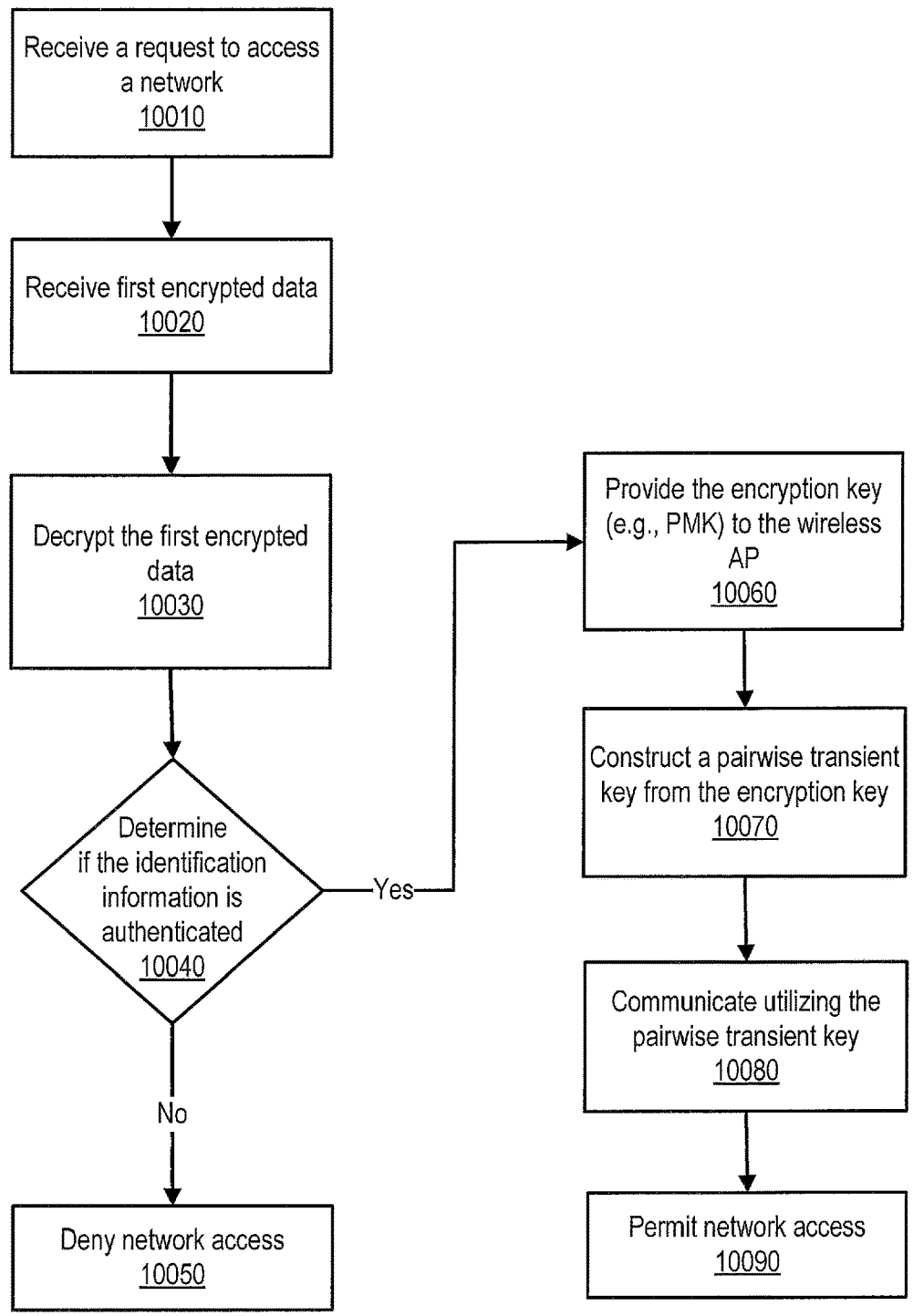
FIG. 10 illustrates a method of providing access to a network, according to one or more embodiments.

Turning now to FIG. 10, a method of providing access to a network is illustrated, according to one or more embodiments. At 10010, a request to access a network can be received. For example, the request to access the network can include a request to access network services and/or network resources provided by and/or associated with network 1420. For instance, NMD 1610 can receive, from MD 1110 coupled to WLAN 1431 (e.g., a first network), a request to access network 1420 (e.g., a second network). In one or more embodiments, the request to access the network can be received via an unsecured wireless communication from a MD to a wireless AP.

At 10020, first encrypted data can be received. In one or more embodiments, can include one or more of identification information and an encryption key (e.g., a PMK). For example, the identification information can include one or more of a username, a password, a MAC address, an encrypted MAC address, an IP address, and a telephone identification (e.g., an IMSI, a MSISDN, a portion of a MSISDN, etc.), among others, can be used to verify and/or authenticate an identity of a device (e.g., a MD from MDs 1110-1143), an identity of a user of a device, etc. In one or more embodiments, the identification information can be associated with a user account (e.g., a subscriber account of a network provider).

In one or more embodiments, the first encrypted data that includes the identification information and/or the encryption key can be received from a MD (e.g., a MD from MDs 1110-1143) via an unsecured wireless communication from the MD to the wireless AP (e.g., an in-band communication). For example, access server 1710 can receive the first encrypted data that includes the identification information and/or the encryption key via an unsecured wireless communication from the MD to the wireless AP. In one or more embodiments, access server 1710 can receive the encryption key from a database (e.g., DB 1740). In one or more embodiments, access server 1710 can receive the encryption key from access server 1711.

In one or more embodiments, the first encrypted data that includes the identification information and/or the encryption key can be encrypted via a TLS, a HTTPS, a VPN, IPsec, and/or a SSL, among others. For example, web interface 1720 can implement and/or include a secure web server that can communication via HTTPS, and web interface 1720 can receive the first encrypted data that includes the identification information and/or the encryption key via HTTPS. For instance, the first encrypted data can be encrypted via a public encryption key of the secure web server implemented by and/or included in web interface 1720.

In one or more embodiments, the request to access the network can include the first encrypted data that includes the identification information and/or the encryption key. For example, functionality associated with method element 10010 can include functionality associated with method element 10020. At 10030, the first encrypted data that includes the identification information and/or the encryption key can be decrypted to obtain the identification information and/or the encryption key. For example, access server 1710 can decrypt the first encrypted data that includes the identification information and/or the encryption key. For instance, the first data can be encrypted via a public encryption key, and access server 1710 can decrypt the first encrypted data via a private encryption key, associated with and/or paired with the public encryption key, to obtain the identification information and/or the encryption key.

In one or more embodiments, access server 1710 can include and/or implement a secure web server that can receive the first encrypted data that includes the identification information and/or the encryption key via HTTPS. For example, web interface 1720 can implement and/or include the secure web server that can decrypt the first encrypted data that includes the identification information and/or the encryption key. For instance, the first data can be encrypted via a public encryption key associated with the secure web server, and the secure web server can decrypt the first encrypted data via a private encryption key, associated with and/or paired with the public encryption key, to obtain the identification information and/or the encryption key.

At 10040, it can be determined if the identification information is authenticated. In one example, determining if the identification information is authenticated can include accessing a database to determine if the identification information is authenticated. In one or more embodiments, access server 1710 can access DB 1740 to determine if the identification information is authenticated, and determining if the identification information is authenticated can include verifying an identity of the MD and/or verifying an identity of a user of the MD. In one instance, verifying an identity of the MD can include querying DB 1740 to determine a match of an identity of the MD with at least a portion of information of a data structure of DB 1740. In another instance, verifying an identity of a user of the MD can include querying DB 1740 to determine a match of an identity of a user of the MD with at least a portion of information of a data structure of DB 1740.

In a second example, determining if the identification information is authenticated can include receiving a response to an authentication request. In one or more embodiments, access server 1710 can receive a response from access server 1711. For example, access server 1710 can be operated by a first network provider, and access server 1711 can be operated by a second, different, network provider. For instance, a user of the MD can be a subscriber of the second network provider, and the first network provider can permit subscribers of the second network provider to roam on one or more networks operated by the first network provider, when the subscribers of the second network provider are authenticated and/or authorized to utilize one or more networks provided by the first network provider, one or more network services provided by the first network provider, and/or access of one or more network resources (e.g., access of network 1420 via one or more wireless APs) provided by the first network provider. In one or more embodiments, the response to the authentication request can include information indicating whether or not the user is authenticated and/or can include the encryption key (e.g., the PMK). In one or more embodiments, determining if the identification information is authenticated can include utilizing an authentication method or process without utilizing an EAP, IEEE 802.1X, and/or WPA.

If the identification information is not authenticated, access to the second network (e.g., network 1420) can be denied at 10050. If the identification information is authenticated, the encryption key (e.g., the PMK) can be provided to the wireless AP at 10060. At 10070, a PTK can be constructed based on the encryption key. For example, wireless AP 1210 can construct the PTK based on the encryption key (e.g., the PMK).

At 10080, the wireless AP and the MD can communicate utilizing the PTK. In one example, the MD can encrypt second data via the PTK and can provide second encrypted data to the wireless AP, and the wireless AP can receive the second encrypted data and can decrypt the second encrypted data, via the PTK, to obtain the second data. In another example, the wireless AP can encrypt third data via the PTK and can provide third encrypted data to the MD, and the MD can receive the third encrypted data and can decrypt the third encrypted data, via the PTK, to obtain the third data.

At 10090, access to the second network (e.g., network 1420) can be permitted. In one example, NMD 1610 can modify ACL 5410 to permit the MD access to one or more services and/or network addresses of network 1420. In a second example, access server 1710 can provide one or more signals to an access control device to permit the MD access of the second network (e.g., access to one or more services and/or network addresses of network 1420). In one instance, access server 1710 can provide one or more signals to wireless AP 1230, and wireless AP 1230 can modify its ACL based on the received one or more signals to permit the MD access to the second network (e.g., network 1420). In another instance, access server 1710 can provide one or more signals to NMD 1610, and NMD 1610 can modify its ACL based on the received one or more signals to permit the MD access to the second network (e.g., network 1420). In one or more embodiments, the second data, obtained via the second encrypted data and the PTK, can be permitted to be provided to the second network (e.g., network 1420). For example, NMD 1610 can provide the second data to network 1420. For instance, the second data can be associated with a destination address associated with CS 1510, and NMD 1610 can provide the second data to CS 1510 via network 1420.

Figure 11:
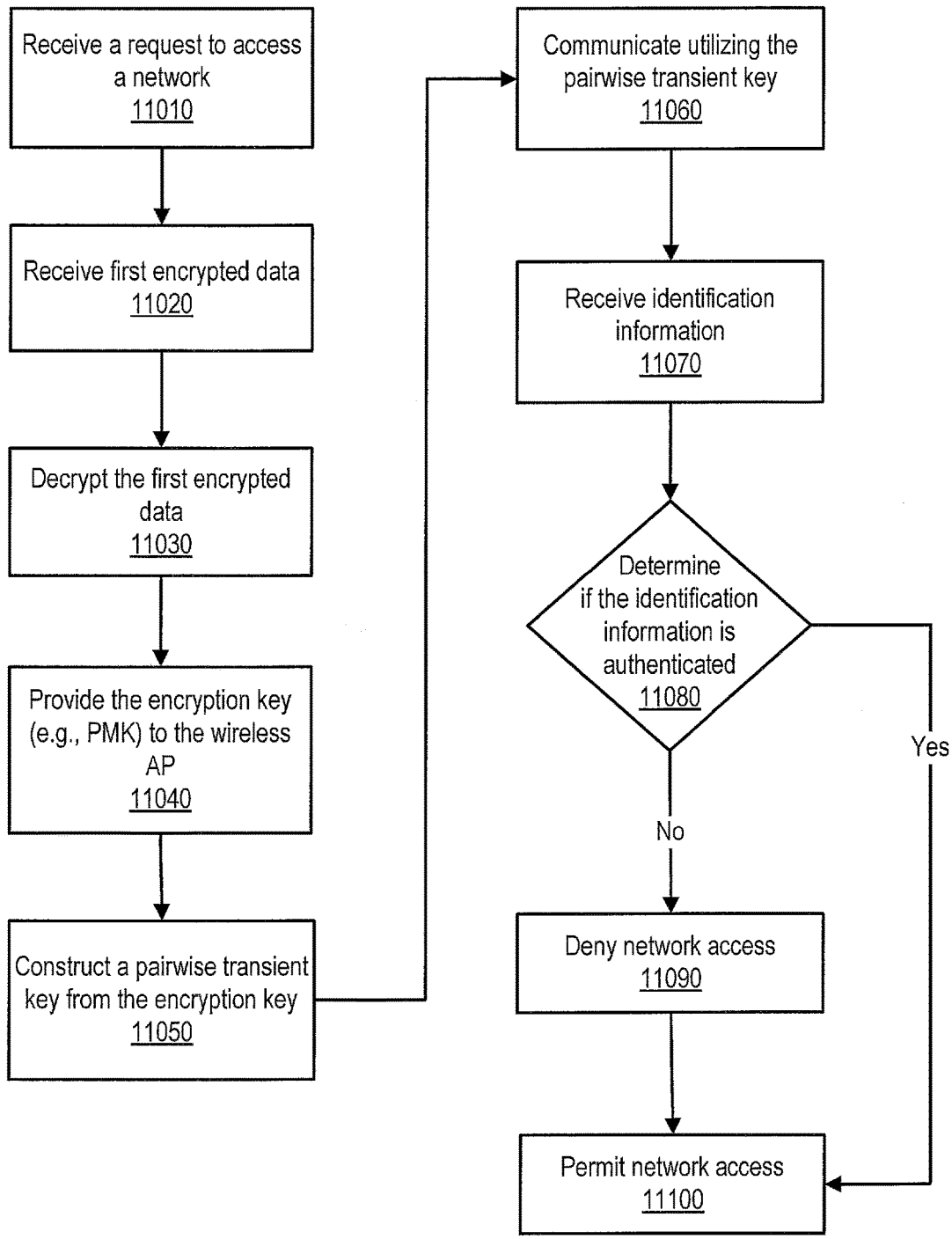
FIG. 11 illustrates another method of providing access to a network, according to one or more embodiments.

Turning now to FIG. 11, another method of providing access to a network is illustrated, according to one or more embodiments. At 11010, a request to access a network can be received. For example, the request to access the network can include a request to access network services and/or network resources provided by and/or associated with network 1420. For instance, NMD 1610 can receive, from MD 1110 coupled to WLAN 1431 (e.g., a first network), a request to access network 1420 (e.g., a second network). In one or more embodiments, the request to access the network can be received via an unsecured wireless communication from a MD to a wireless AP.

At 11020, first encrypted data can be received. In one or more embodiments, the first encrypted data can include an encryption key (e.g., a PMK). In one or more embodiments, the first encrypted data that includes the encryption key can be received from a MD (e.g., a MD from MDs 1110-1143) via an unsecured wireless communication from the MD to the wireless AP (e.g., an in-band communication). For example, access server 1710 can receive the first encrypted data that includes the encryption key via an unsecured wireless communication from the MD to the wireless AP. In one or more embodiments, access server 1710 can receive the encryption key from a database (e.g., DB 1740). In one or more embodiments, access server 1710 can receive the encryption key from access server 1711.

In one or more embodiments, the first encrypted data that includes the encryption key can be encrypted via a TLS, a HTTPS, a VPN, IPsec, and/or a SSL, among others. For example, web interface 1720 can implement and/or include a secure web server that can communication via HTTPS, and web interface 1720 can receive the first encrypted data that includes the encryption key via HTTPS. For instance, the first encrypted data can be encrypted via a public encryption key of the secure web server implemented by and/or included in web interface 1720.

In one or more embodiments, the request to access the network can include the first encrypted data that includes the encryption key. For example, functionality associated with method element 11010 can include functionality associated with method element 11020. At 11030, the first encrypted data that includes the encryption key can be decrypted to obtain and/or the encryption key. In one or more embodiments, access server 1710 can include and/or implement a secure web server that can receive the first encrypted data that includes the encryption key via HTTPS. For example, web interface 1720 can implement and/or include the secure web server that can decrypt the first encrypted data that includes the encryption key. For instance, the first data can be encrypted via a public encryption key associated with the secure web server, and the secure web server can decrypt the first encrypted data via a private encryption key, associated with and/or paired with the public encryption key, to obtain the encryption key.

At 11040, the encryption key (e.g., the PMK) can be provided to the wireless AP. In one or more embodiments, the encryption key can be provided to the wireless AP in a secure fashion. At 11050, a PTK can be constructed based on the encryption key. For example, wireless AP 1210 can construct the PTK based on the encryption key (e.g., the PMK). At 11060, the wireless AP and the MD can communicate utilizing the PTK. In one example, the MD can encrypt second data via the PTK and can provide second encrypted data to the wireless AP, and the wireless AP can receive the second encrypted data and can decrypt the second encrypted data, via the PTK, to obtain the second data. In another example, the wireless AP can encrypt third data via the PTK and can provide third encrypted data to the MD, and the MD can receive the third encrypted data and can decrypt the third encrypted data, via the PTK, to obtain the third data.

At 11070, identification information can be received. In one example, an access server can receive the identification information from a MD. In another example, a NMD can receive the identification information from a MD. In one or more embodiments, the identification information can include one or more of a username, a password, a MAC address, an encrypted MAC address, an IP address, and a telephone identification (e.g., an IMSI, a MSISDN, a portion of a MSISDN, etc.), among others, can be used to verify and/or authenticate an identity of a device (e.g., a MD from MDs 1110-1143), an identity of a user of a device, etc. In one or more embodiments, the identification information can be associated with a user account (e.g., a subscriber account of a network provider).

At 11080, it can be determined if the identification information is authenticated. In one example, determining if the identification information is authenticated can include accessing a database to determine if the identification information is authenticated. In one or more embodiments, access server 1710 can access DB 1740 to determine if the identification information is authenticated, and determining if the identification information is authenticated can include verifying an identity of the MD and/or verifying an identity of a user of the MD. In one instance, verifying an identity of the MD can include querying DB 1740 to determine a match of an identity of the MD with at least a portion of information of a data structure of DB 1740. In another instance, verifying an identity of a user of the MD can include querying DB 1740 to determine a match of an identity of a user of the MD with at least a portion of information of a data structure of DB 1740.

In a second example, determining if the identification information is authenticated can include receiving a response to an authentication request. In one or more embodiments, access server 1710 can receive a response from access server 1711. For example, access server 1710 can be operated by a first network provider, and access server 1711 can be operated by a second, different, network provider. For instance, a user of the MD can be a subscriber of the second network provider, and the first network provider can permit subscribers of the second network provider to roam on one or more networks operated by the first network provider, when the subscribers of the second network provider are authenticated and/or authorized to utilize one or more networks provided by the first network provider, one or more network services provided by the first network provider, and/or access of one or more network resources (e.g., access of network 1420 via one or more wireless APs) provided by the first network provider. In one or more embodiments, the response to the authentication request can include information indicating whether or not the user is authenticated and/or can include the encryption key (e.g., the PMK). In one or more embodiments, determining if the identification information is authenticated can include utilizing an authentication method or process without utilizing an EAP, IEEE 802.1X, and/or WPA.

If the identification information is not authenticated, access to the second network (e.g., network 1420) can be denied at 11090. If the identification information is authenticated, access to the second network (e.g., network 1420) can be permitted at 11100. In one example, NMD 1610 can modify ACL 5410 to permit the MD access to one or more services and/or network addresses of network 1420. In a second example, access server 1710 can provide one or more signals to an access control device to permit the MD access of the second network (e.g., access to one or more services and/or network addresses of network 1420).

In one instance, access server 1710 can provide one or more signals to wireless AP 1230, and wireless AP 1230 can modify its ACL based on the received one or more signals to permit the MD access to the second network (e.g., network 1420). In another instance, access server 1710 can provide one or more signals to NMD 1610, and NMD 1610 can modify its ACL based on the received one or more signals to permit the MD access to the second network (e.g., network 1420).

In one or more embodiments, the term "memory medium" can mean a "memory" and/or "tangible computer readable medium" which is intended to include various types of memory or storage, including an installation medium, e.g., a CD-ROM, or floppy disks, a random access memory or computer system memory such as DRAM, SRAM, EDO RAM, Rambus RAM, etc., and/or a non-volatile memory such as NVRAM, EPROM, EEPROM, a SIM card, flash memory, FRAM a magnetic media, e.g., a hard drive, and/or optical storage. The memory medium can include other types of memory as well, or combinations thereof. In one or more embodiments, the memory medium can be and/or include an article of manufacture and/or a software product that stores instructions executable by a processor to implement one or more methods and/or processes described herein. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, PDA, laptop, mobile telephone, mobile multimedia device, embedded computer system, television system, and/or other device. In general, the terms "computing device", "computer", and/or "computer system" can be broadly defined to encompass any device having a processor which executes instructions from a memory medium. A CPU or processing unit in one or more systems executing code and data from a memory medium includes a means for executing one or more software program according to the methods and/or flowcharts described herein.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. In one example, one or more of the methods described with reference to FIGS. 9 and 10 can be repeated with one or more of a different MD, a different encryption key (e.g., a different PMK), different identification information, a different user of the different MD, a different wireless AP, and a different NMD. In a second example, one or more of the methods described with reference to FIGS. 9 and 10 can be repeated with one or more of a same MD, a same user of the MD, a same encryption key (e.g., a same PMK), same identification information, a same wireless AP, and a same NMD.

Additional and/or duplicated method elements can be performed as desired. For example, a process and/or method can perform one or more described method elements concurrently with duplicates of the one or more described method elements. For instance, multiple methods, processes, and/or threads can be implemented using same described method elements. It is noted also that, in one or more embodiments, one or more of the interactions or messages of a sequence diagram can be performed in varying orders, can be repeated, can be performed concurrently with one or more of the other interactions or messages of the sequence diagram and/or one or more portions of an implementation of an interaction or message of the sequence diagram, or can be omitted.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method comprising:
receiving, at an access server, a communication from a network management device, wherein the communication is sent from a mobile device via an unsecured wireless connection of a first network to an access point, wherein the communication is sent from the access point to the network management device and from the network management device via a second network to the access server, wherein the network management device manages network access of devices to the second network for a plurality of access points, and wherein the communication includes first encrypted data and is associated with a request by the mobile device to access the second network;
transmitting, from the access server, an encryption key to the access point based on the first encrypted data to enable the access point to establish a secure wireless connection between the access point and the mobile device, wherein the access server determines the encryption key by identifying a profile associated with an identifier included in the first encrypted data, wherein the profile is stored in a database accessible to the access server, and wherein the encryption key is associated with the profile; and transmitting signals from the access server to the network management device to enable modification of an access control list to indicate that the mobile device is authorized to access the second network, wherein the access control list includes source address information, destination address information, service information, and data traffic direction information.

2. The method of claim 1, wherein the first encrypted data is encrypted using a private encryption key of a network provider of the first network.

3. The method of claim 1, wherein the encryption key is usable by the access point to communicate with the mobile device.

4. The method of claim 1, further comprising, prior to transmitting the encryption key to the access point:
receiving, from the mobile device via the access point, identification information associated with a user account;
sending the identification information to an authentication server; and
receiving, from the authentication server, an indication that the mobile device is authenticated,
wherein the access server provides the signals to the network management device to permit the mobile device to access the second network in response to the indication.

5. The method of claim 1, wherein the encryption key is a session key utilizable for a period of time.

6. The method of claim 1, wherein the encryption key includes a pairwise master key used by the mobile device and the access point to determine a pairwise transient key.

7. The method of claim 1, wherein the signals instruct the network management device to modify the access control list to include a particular service available via the second network.

8. A system comprising:
a processor;
a receiver device coupled to the processor, the receiver device configured to receive a communication from a network management device, wherein the communication is sent from a mobile device via an unsecured wireless connection of a first network to an access point, wherein the communication is sent from the access point to the network management device and is received from the network management device via a second network, wherein the network management device manages network access of devices to the second network for a plurality of access points, and wherein the communication includes first encrypted data and is associated with a request by the mobile device to access the second network; and
a transmitter device coupled to the processor, the transmitter device configured to transmit an encryption key to the access point based on the first encrypted data to enable the access point to establish a secure wireless connection between the access point and the mobile device and the transmitter device configured to transmit signals to the network management device to enable modification of an access control list to indicate that the mobile device is authorized to access the second network, wherein the processor determines the encryption key by identifying a profile associated with an identifier included in the first encrypted data, wherein the profile is stored in a database accessible to the processor, wherein the encryption key is associated with the profile, and wherein the access control list includes source address information, destination address information, service information, and data traffic direction information.

9. The system of claim 8, further comprising an access server that includes the receiver device and the transmitter device.

10. The system of claim 9, wherein the access server is coupled to the access point.

11. The system of claim 9, wherein the access server is further configured to transmit the encryption key to the mobile device via the access point.

12. The system of claim 9, wherein the access server is configured to control access by the mobile device to the second network based on a second access control list maintained by the access server.

13. The system of claim 12, wherein the second access control list identifies a domain name service device accessible by the mobile device via the second network, a web server accessible by a mobile device via the second network, or a combination thereof.

14. The system of claim 8, further comprising a secure web server that includes the receiver device and the transmitter device.

15. The system of claim 14, wherein the secure web server is configured to use a private encryption key to decrypt the first encrypted data.

16. The system of claim 15, wherein the private encryption key is associated with a public encryption key.

17. A computer readable memory device comprising instructions, which when executed by a processor of an access server, cause the processor to perform operations comprising:
receiving, at the access server, a communication from a network management device, wherein the communication is sent from a mobile device via an unsecured wireless connection of a first network to an access point, wherein the communication is sent from the access point to the network management device and from the network management device via a second network to the access server, wherein the network management device manages network access of devices to the second network for a plurality of access points, and wherein the communication includes first encrypted data and is associated with a request by the mobile device to access the second network;
transmitting, from the access server, an encryption key to the access point based on the first encrypted data to enable the access point to establish a secure wireless connection between the access point and the mobile device, wherein the access server determines the encryption key by identifying a profile associated with an identifier included in the first encrypted data, wherein the profile is stored in a database accessible to the access server, and wherein the encryption key is associated with the profile; and
transmitting signals to the network management device to enable modification of an access control list to indicate that the mobile device is authorized to access the second network, wherein the access control list includes source address information, destination address information, service information, and data traffic direction information.

18. The computer readable memory device of claim 17, wherein the first encrypted data is encrypted using a private encryption key of a network provider of the first network.

19. The computer readable memory device of claim 17, wherein the encryption key is usable by the access point to communicate with the mobile device.

20. The computer readable memory device of claim 17, wherein the operations further comprise:
   prior to transmitting the encryption key to the access point:
      receiving, from the mobile device via the access point, identification information associated with a user account;
      sending the identification information to an authentication server; and
      receiving, from the authentication server, an indication that the mobile device is authenticated,
   wherein the access server provides the signals to the network management device to permit the mobile device to access the second network in response to the indication.

\* \* \* \* \*